(12) United States Patent
Sennami et al.

(10) Patent No.: US 8,318,339 B2
(45) Date of Patent: Nov. 27, 2012

(54) BATTERY PACK

(75) Inventors: Hiromitsu Sennami, Fukushima (JP); Masashi Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 486 days.

(21) Appl. No.: 12/539,375

(22) Filed: Aug. 11, 2009

(65) Prior Publication Data
US 2010/0040947 A1  Feb. 18, 2010

(30) Foreign Application Priority Data

Aug. 12, 2008  (JP) .................. 2008-208268

(51) Int. Cl.
*H01M 2/02* (2006.01)
(52) U.S. Cl. ......... 429/163; 429/167; 429/177; 429/178
(58) Field of Classification Search .................. 429/163, 429/167, 177, 178
See application file for complete search history.

(56) References Cited

U.S. PATENT DOCUMENTS

| | | |
|---|---|---|
| 2001/0016279 A1 | 8/2001 | Shiota et al. |
| 2001/0051298 A1 | 12/2001 | Hanafusa et al. |
| 2004/0115527 A1 | 6/2004 | Hiratsuka et al. |

FOREIGN PATENT DOCUMENTS

| | | |
|---|---|---|
| JP | 2001-319633 | 11/2001 |
| JP | 2001-357825 | 12/2001 |
| JP | 2002-260608 | 9/2002 |
| JP | 2005-166650 | 6/2005 |
| JP | 2007-323909 | 12/2007 |
| JP | 2008181702 | 8/2008 |
| WO | 01/08248 A1 | 2/2001 |

OTHER PUBLICATIONS

Japanese Office Action issued Dec. 14, 2010, corresponding to Japanese Appln. No. 2008-208268.
Extended European Search Report dated Oct. 6, 2009, for corresponding Patent Application EP 09010346.6.
Singapore Written Opinion for corresponding 200904752-3, dated Feb. 24, 2010.
Singapore Search Report for corresponding 200904752-3, dated Feb. 24, 2010.

*Primary Examiner* — Jane Rhee
(74) *Attorney, Agent, or Firm* — K&L Gates LLP

(57) ABSTRACT

A battery pack is provided and includes an outer package and a battery element housed in the outer package. The outer package includes a laminate having a conductive layer, and a positive electrode terminal or a negative electrode terminal of the battery element is electrically connected to the conductive layer.

6 Claims, 26 Drawing Sheets

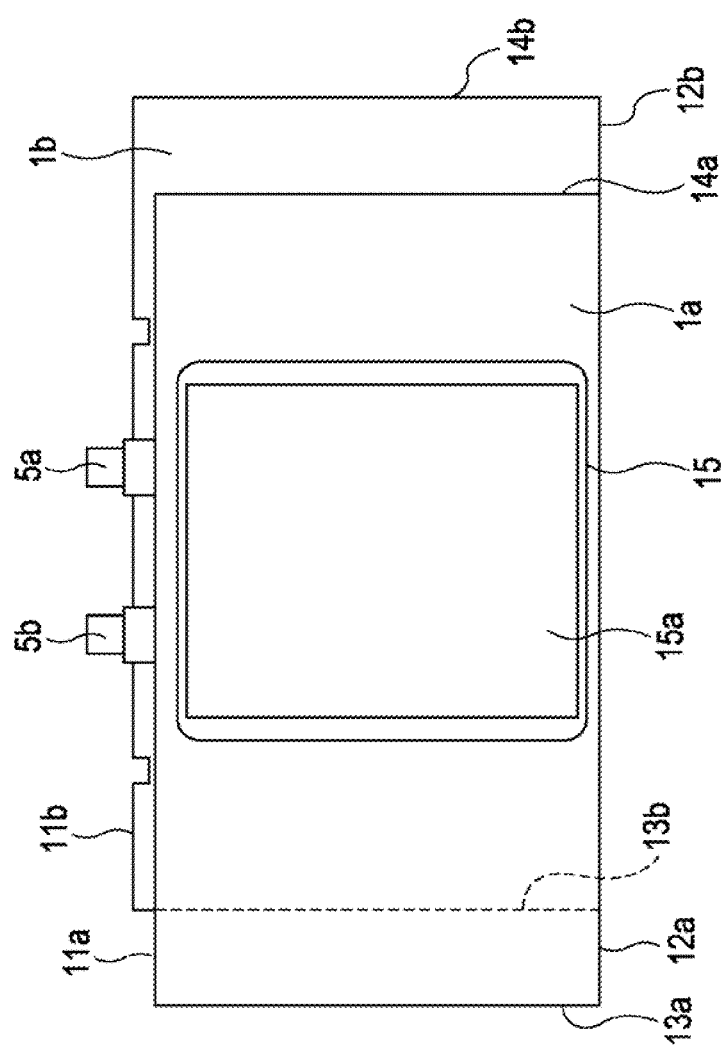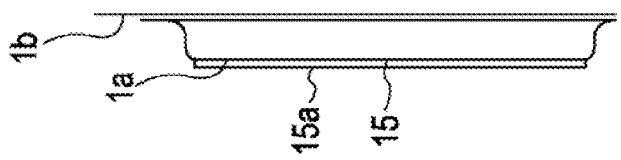

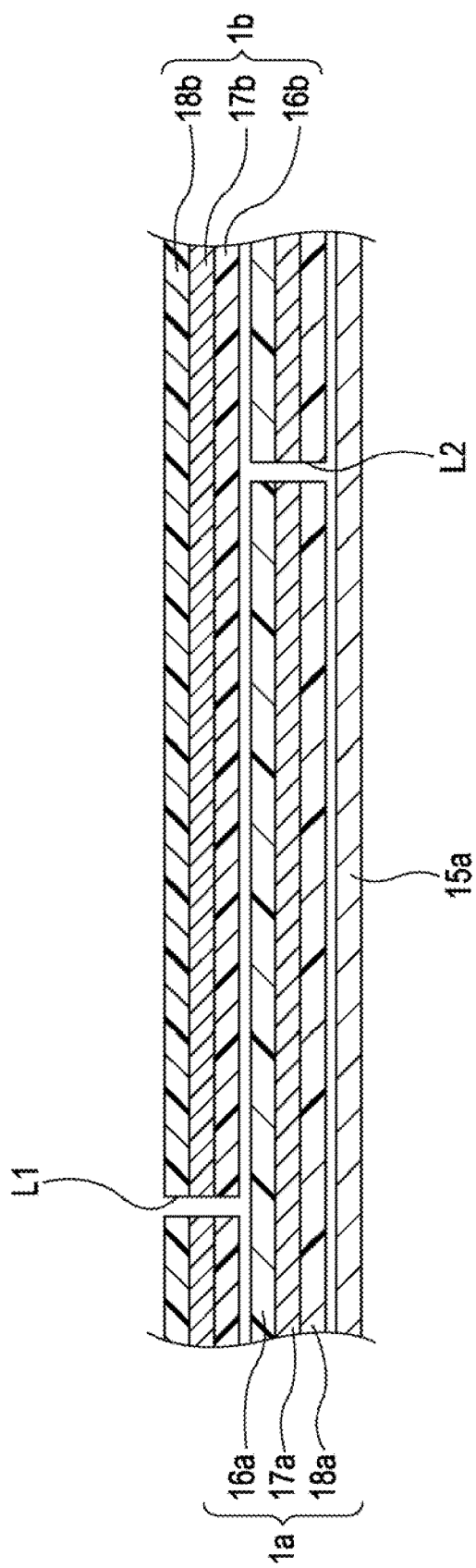

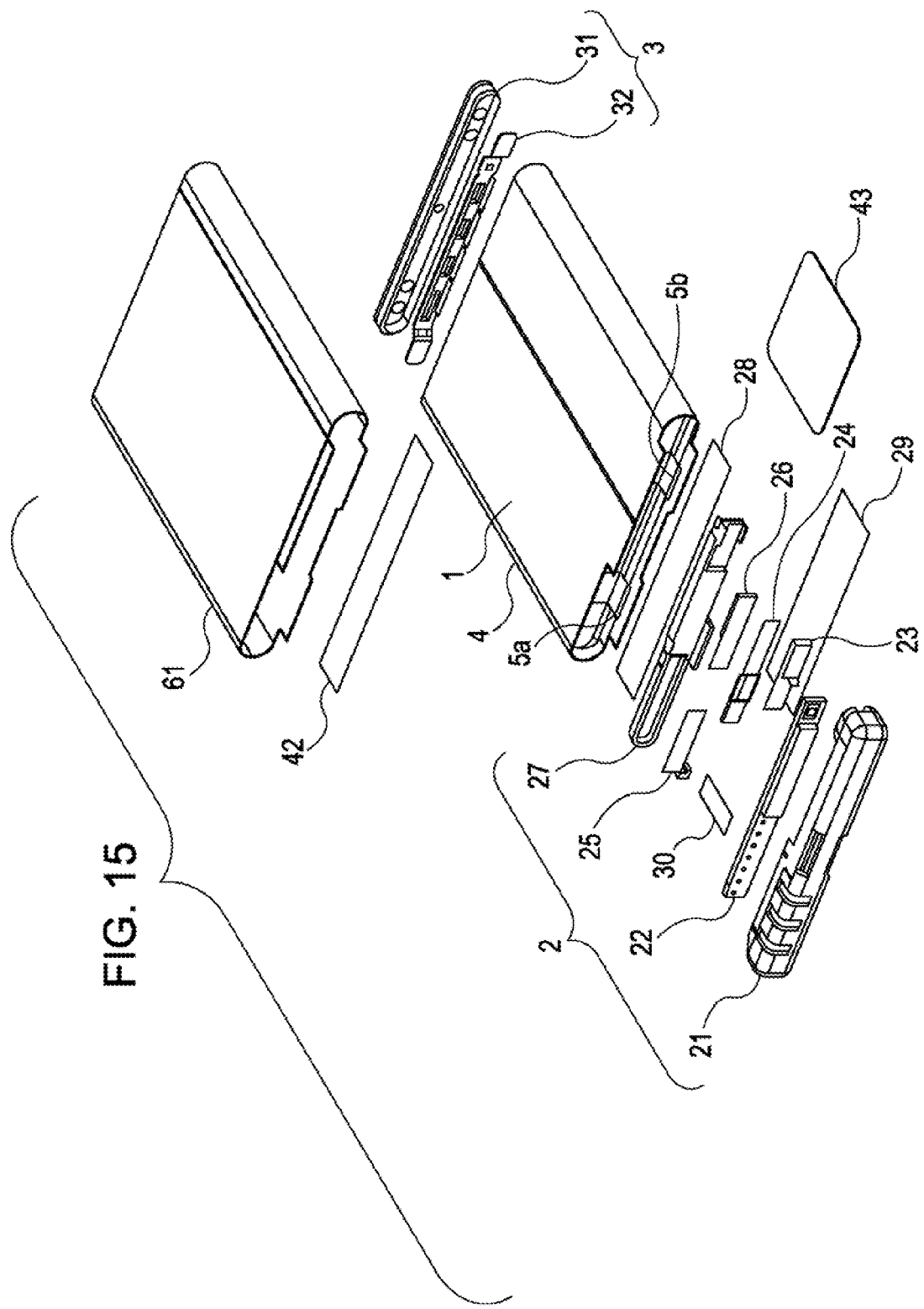

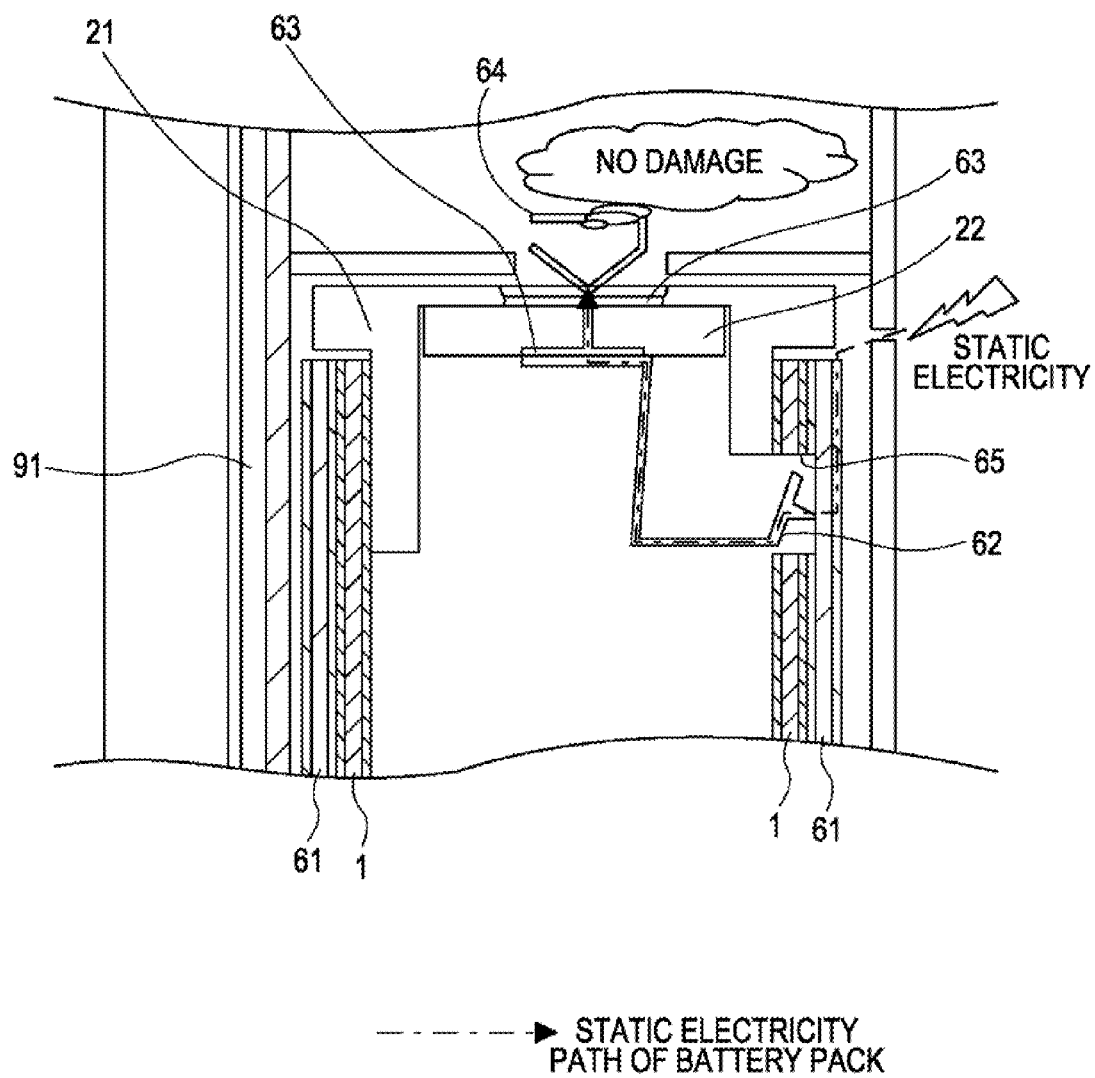

FIG. 23A
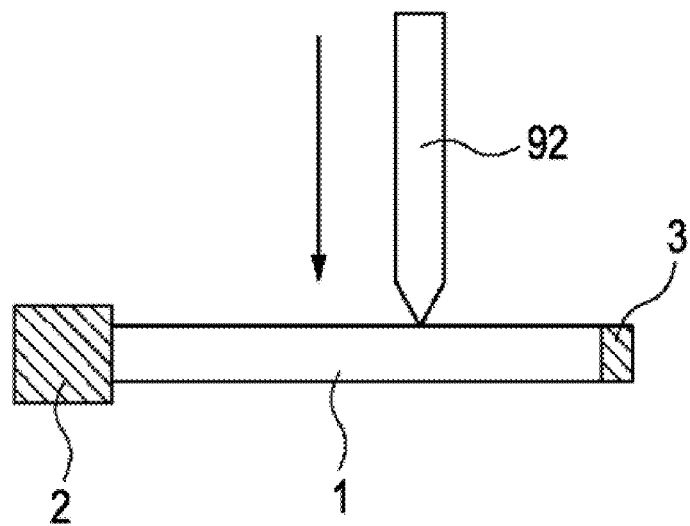
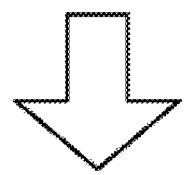
FIG. 23B
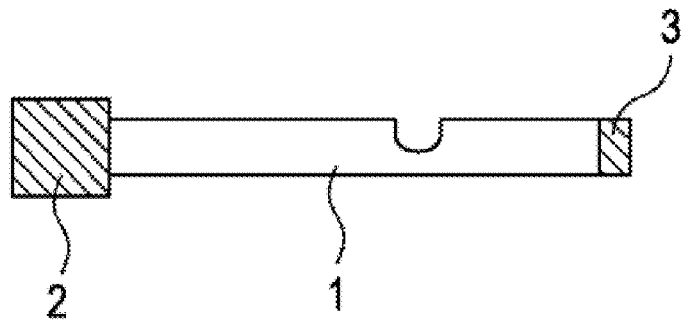

FIG. 25A
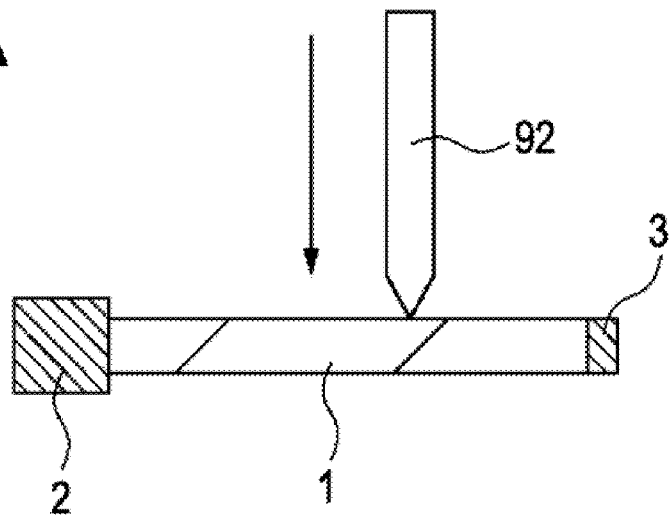
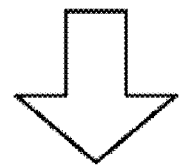
FIG. 25B
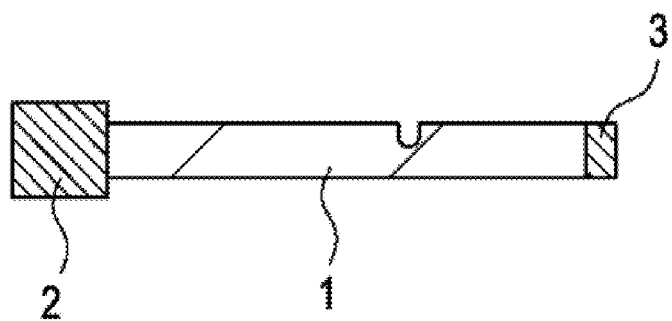

BATTERY PACK

CROSS REFERENCES TO RELATED APPLICATIONS

The present application claims priority to Japanese Priority Patent Application JP 2008-208268 filed in the Japan Patent Office on Aug. 12, 2008, the entire content of which is hereby incorporated by reference.

BACKGROUND

The present disclosure relates to battery packs. More particularly, the present disclosure relates to a battery pack in which a battery element is covered with an outer package.

In recent years, battery packs have been used as power sources for mobile electronic devices. In such battery packs, an outer package houses a protection circuit board, on which a protection circuit, etc. are mounted, and a battery element. As an outer package used for such a battery pack, a box-shaped package including upper and lower cases, etc. is widely used. For example, refer to Japanese Unexamined Patent Application Publication No. 2002-260608.

However, in the battery pack described above, when electrostatic discharge (ESD) occurs, static electricity may flow in the circuit board inside the battery pack, resulting in a malfunction of electronic circuits or damage to semiconductor elements. In order to solve such a problem, a technique has been proposed in which a conductive layer is disposed on the surface of a plastic molded case, and the conductive layer is connected to a negative electrode terminal of a battery. For example, refer to Japanese Unexamined Patent Application Publication No. 2007-323909. However, such a battery pack necessitates a great change in the design of the outer package of the battery pack.

Furthermore, when the battery pack described above is contained and used in an electronic device, such as a mobile phone, functional failure may be caused in the body of the electronic device due to the occurrence of ESD. In particular, in the case where the body of the electronic device has a structure having low tolerance to electrostatic discharge, the probability of occurrence of functional failure is high.

FIG. 26A is a schematic view showing a battery pack housing part of an electronic device, such as a mobile phone. As shown in FIG. 26A, in general, a battery pack housing part 101 is provided with openings 102, and a circuit board of the electronic device is exposed through the openings 102. In the electronic device having such a structure, when ESD occurs, there is a possibility that a conductive layer disposed on the surface of the outer package may form a static electricity path, and static electricity may flow in the circuit board exposed through the openings 102, resulting in a malfunction of electronic circuits or damage to semiconductor elements.

In order to solve the problem described above, it is conceivable to fill all the openings 102 of the battery pack housing part 101 with a plastic resin so that the circuit board of the electronic device is not exposed at the battery pack housing part 101, as shown in FIG. 26B. However, if such a concept is introduced, the design of the battery pack housing part 101 of the electronic device body is restricted. Under these circumstances, a technique has been proposed in which a component for protecting against electrostatic discharge (ESD) is added to a circuit of a battery pack.

FIG. 27A shows a circuit before addition of a component for protection against ESD. FIG. 27B shows a circuit after addition of a component for protecting against ESD. As shown FIG. 27B, a capacitor is provided between an identification terminal 111, which is referred to as a BSI terminal or an ID terminal, and a negative electrode terminal 112. However, even when such a component for protecting against ESD is added, it is difficult to obtain a sufficient effect. Furthermore, depending on the magnitude of electrostatic discharge, the added circuit may still be damaged, resulting in malfunction.

It is desirable to provide a battery pack in which ESD tolerance can be improved without greatly changing the design of the battery pack or a battery housing part of an electronic device body.

SUMMARY

In an embodiment, by using, as an outer package, a laminate including a conductive layer and by connecting the conductive layer of the laminate to a positive electrode terminal or a negative electrode terminal of a battery element, ESD tolerance can be improved without greatly changing the design of the battery pack or the battery housing part of the electronic device body.

A battery pack according to an embodiment includes an outer package and a battery element housed in the outer package. The outer package includes a laminate having a conductive layer, and a positive electrode terminal or a negative electrode terminal of the battery element is electrically connected to the conductive layer.

According to this embodiment, the outer package itself includes a conductive layer, and the conductive layer is electrically connected to a positive electrode terminal or a negative electrode terminal of the battery element. Therefore, it is not necessary to greatly change the design of the outer package or a battery housing part of the electronic device body.

When the conductive layer of the outer package is electrically connected to the positive electrode terminal, static electricity due to ESD flows in the charging direction of the battery element. Therefore, static electricity is assumed to be attenuated through the battery element. Consequently, it is possible to prevent static electricity from flowing into the circuit board of the electronic device disposed in the vicinity of the battery pack housing part in an amount equivalent to the amount of static electricity charged to (absorbed by) the battery element.

When the conductive layer of the outer package is electrically connected to the negative electrode terminal, static electricity due to ESD flows in the discharging direction of the battery element. Therefore, static electricity is assumed to flow into the negative electrode terminal of the electronic device without passing through the battery element. Consequently, it is possible to prevent static electricity from flowing into the circuit board of the electronic device disposed in the vicinity of the battery pack housing part.

A battery pack according to another embodiment includes an outer package, a battery element housed in the outer package, and a surface member which covers the outer package. The surface member includes a metal layer, and a positive electrode terminal or a negative electrode terminal of the battery element is electrically connected to the metal layer of the surface member.

As described above, according to any of the embodiments, it is possible to improve ESC tolerance without greatly changing the design of the battery pack or the battery housing part of the electronic device body.

Additional features and advantages are described herein, and will be apparent from the following Detailed Description and the figures.

BRIEF DESCRIPTION OF THE FIGURES

FIGS. 4A to 4C are development views showing an example of a shape of an outer package of a battery element;

FIG. 9 is a cross-sectional view showing a joint portion of the outer package;

FIG. 15 is an exploded perspective view showing one structural example of a battery pack according to a third embodiment;

FIG. 18 is a cross-sectional view showing one structural example of a battery pack according to a fourth embodiment;

FIGS. 23A and 23B are schematic views used for describing a punching durability test for a battery pack in Example 11;

FIGS. 25A and 25B are schematic views used for describing a punching durability test for a battery pack in Example 12;

DETAILED DESCRIPTION

Figure 1:
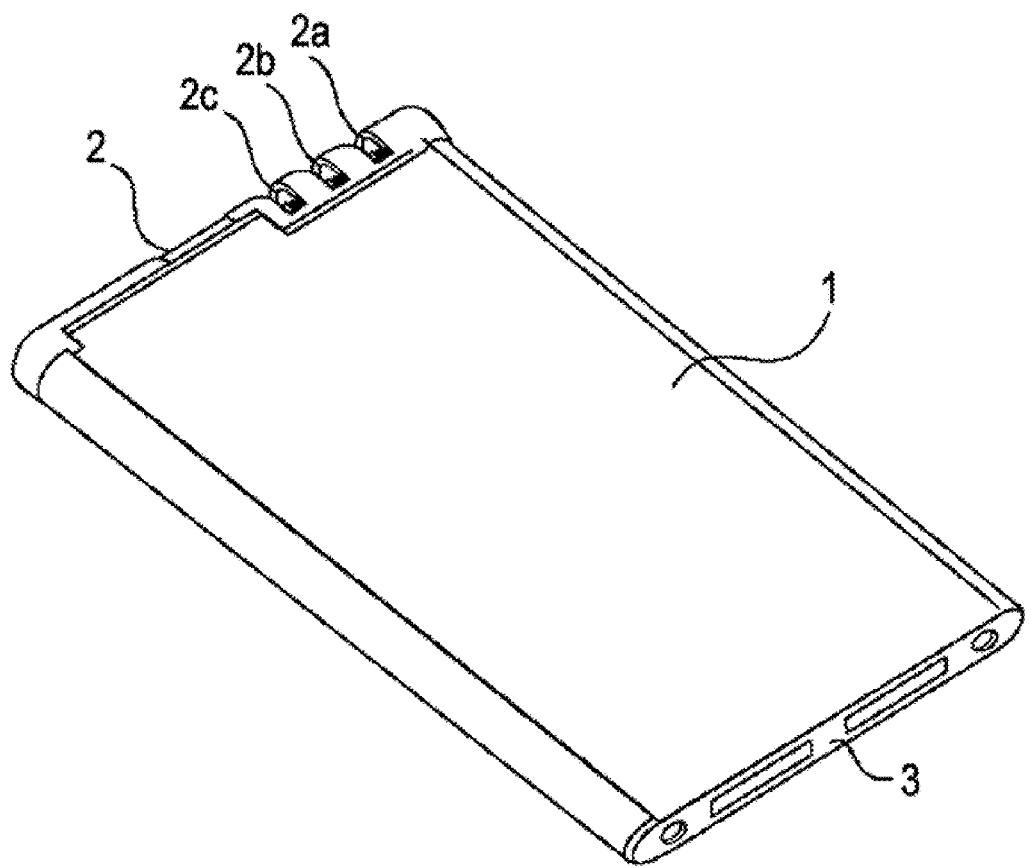
FIG. 1 is a perspective view showing an appearance of a battery pack according to a first embodiment.

The embodiments will be described with reference to the drawings. In all the drawings relating to the embodiments, the same or corresponding parts are designated by the same reference numerals.

(1) First Embodiment

(1-1) Structure of Battery Pack

Figure 2:
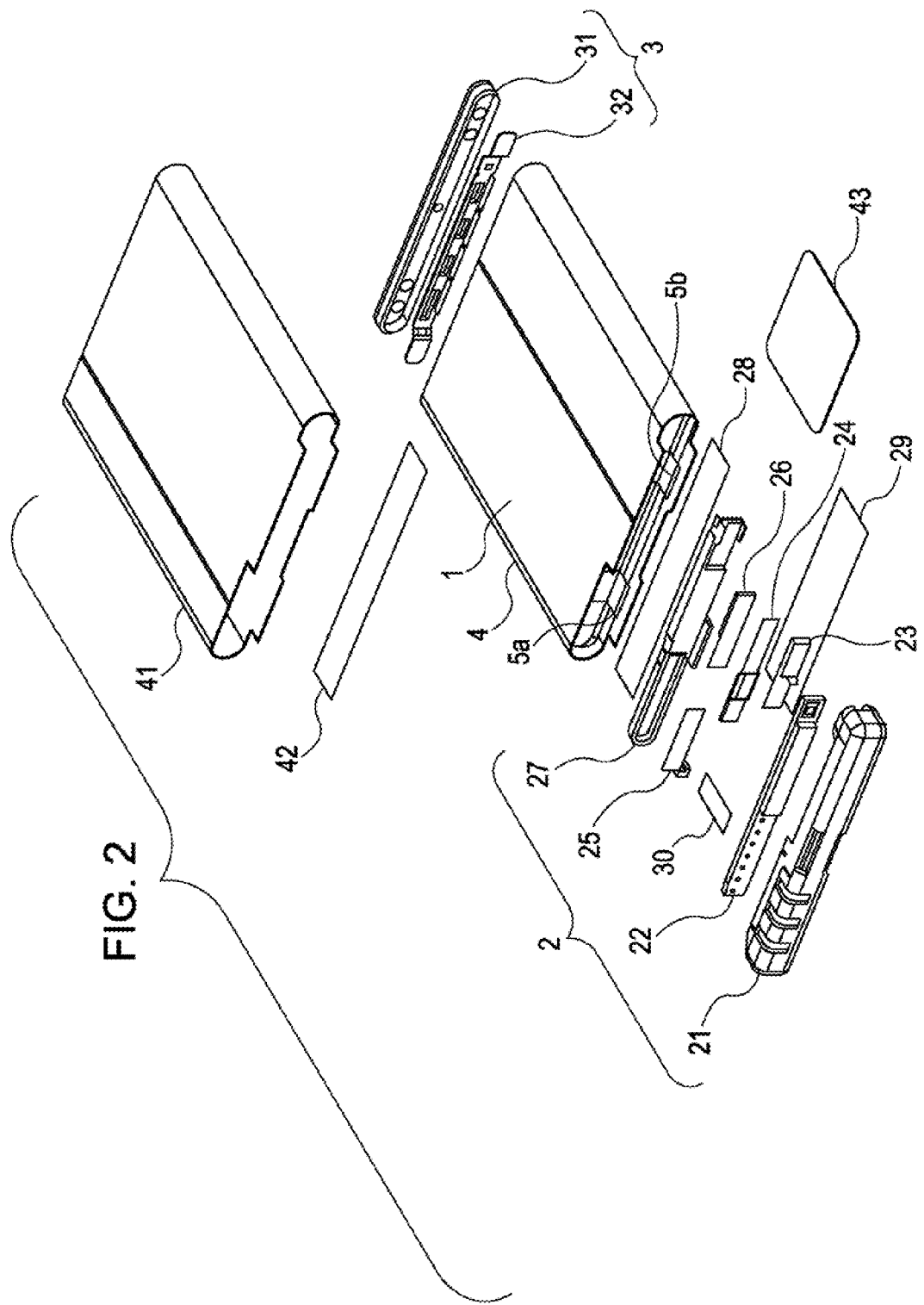
FIG. 2 is an exploded perspective view showing one structural example of the battery pack according to the first embodiment.

FIG. 1 is a perspective view showing an appearance of a battery pack according to a first embodiment. FIG. 2 is an exploded perspective view showing one structural example of a battery pack according to the first embodiment. The battery pack is, for example, a rectangular or flat-type battery pack of a lithium ion polymer secondary battery. As shown in FIG. 1, in the battery pack, an outer package 1 houses a battery element, and a top cover 2 and a bottom cover 3 are fitted into openings at both ends. The top cover 2 is provided with a positive electrode terminal 2a, a negative electrode terminal 2b, and an identification terminal 2c. A surface of the outer package 1 is covered with a label which is a surface member.

Hereinafter, the opening into which the top cover 2 is fitted is referred to as a "top opening", and the opening into which the bottom cover 3 is fitted is referred to as a "bottom opening". A positive electrode lead 5a led from the battery element and a conductive layer of the outer package 1 are electrically connected to each other by a connecting member 30. Thereby, the conductive layer of the outer package 1 has the same electric potential as the positive electrode of the battery element. Preferably, the resistance R between the positive electrode terminal 2a of the battery pack and the metal layer of the outer package 1 is 1 MΩ or less. In such a case, ESD tolerance can be further improved.

Examples of the connecting member 30 that can be used include a conductive tape; a tab, such as a nickel tab; a linear member, such as a copper wire; and a resistor attached with a lead. The connecting member 30 is not limited thereto, and any member capable of electrically connecting the positive electrode lead 5a led from the battery element 4 to the conductive layer of the outer package 1 can be used. Furthermore, as the material for the connecting member, such as a conductive tape, a tab, or a linear member, for example, a metal, an electrically conductive functional material, or carbon can be used, although not particularly limited thereto. Examples of the electrically conductive functional material that can be used include an electrically conductive plastic obtained by alloying a resin with carbon, and an electrically conductive plastic, such as polyacetylene. Examples of the metal that can be used include nickel, stainless steel (hereinafter referred to as "SUS"), and copper. Examples of the connecting method for the connecting member 30 include resistance welding, ultrasonic welding, heat sealing, use of adhesive tape, caulking, and soldering. The connecting method is not limited thereto, and any method that ensures electrical conductivity can be used.

The battery element 4, the outer package 1, the top cover 2, and the bottom cover 3 will be described below.

<Battery Element>

Figure 3:
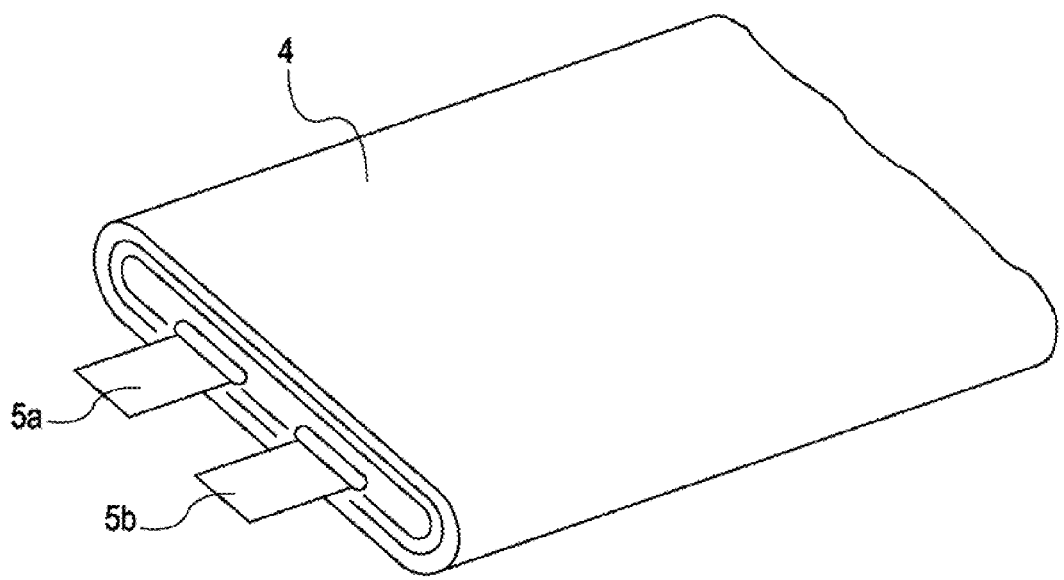
FIG. 3 is a perspective view showing an example of an appearance of a battery element according to the first embodiment.

FIG. 3 is a perspective view showing an example of an appearance of a battery element 4 according to the first embodiment. As shown in FIG. 3, the battery element 4, for example, has a rectangular or flat shape. A strip-like positive electrode and a strip-like negative electrode are laminated with a polymer electrolyte and a separator interposed therebetween, and wound in the longitudinal direction. A positive electrode lead 5a and a negative electrode lead 5b are respectively led from the positive electrode and the negative electrode.

The positive electrode includes a strip-like positive electrode current collector, a positive electrode active material layer disposed on the positive electrode current collector, and a polymer electrolyte layer disposed on the positive electrode active material layer. The negative electrode includes a strip-like negative electrode current collector, a negative electrode active material layer disposed on the negative electrode current collector, and a polymer electrolyte layer disposed on the negative electrode active material layer. The positive electrode lead 5a of the positive electrode and the negative electrode lead 5b of the negative electrode are respectively connected to the positive electrode current collector and the negative electrode current collector. As the positive electrode active material, the negative electrode active material, the polymer electrolyte, commonly used materials can be used.

In the positive electrode, according to the type of the desired battery, a metal oxide, a metal sulfide, or a specific polymer may be used as a positive electrode active material. For example, when a lithium ion battery is fabricated, a lithium compound oxide containing, as a main component, $Li_xMO_2$ (wherein M represents at least one transition metal, and X varies depending on the charge/discharge state of the battery and is usually in a range of 0.05 to 1.10) may be used as the positive electrode active material. As the transition metal M constituting the lithium compound oxide, cobalt (Co), nickel (Ni), manganese (Mn), or the like is preferable.

Specific examples of the lithium compound oxide include $LiCoO_2$, $LiNiO_2$, $LiNi_yCO_{1-y}O_2$ (wherein $0<y<1$), and $LiMn_2O_4$. These lithium compound oxides can generate high voltage and provide excellent energy density. Furthermore, as the positive electrode active material, a metal sulfide or oxide which does not contain lithium, such as $TiS_2$, $MoS_2$, $NbSe_2$, or $V_2O_5$, may be used. In the positive electrode, a plurality of types of positive electrode active materials may be combined for use. In the process of forming a positive electrode using the positive electrode active material described above, a conductive agent, a binder, etc. may also be added.

As a negative electrode active material, a material capable of being doped with and dedoped from lithium may be used. For example, a carbon material, such as a hardly graphitizable carbon material or a graphite material, may be used. Specific examples of the carbon material that can be used include pyrolytic carbons, cokes (pitch coke, needle coke, petroleum coke, etc.), graphites, vitreous carbon, sintered organic polymer compounds (carbonized compounds obtained by firing a phenolic resin, a furan resin, or the like at an appropriate temperature), carbon fibers, and activated carbon. Furthermore, as the material capable of being doped with and dedoped from lithium, a polymer, such as polyacetylene or polypyrrole, or an oxide, such as $SnO_2$, may be used. In the process of forming a negative electrode using the material described above, a binder, etc. may also be added.

The polymer electrolyte is, for example, obtained by incorporating a gelled electrolyte into a polymer, the gelled electrolyte being formed by mixing a polymer material, an electrolyte solution, and an electrolyte salt. The polymer material dissolves in the electrolyte solution. Examples of the polymer material that can be used include silicon gel, acryl gel, acrylonitrile gel, modified polyphosphazene polymer, polyethylene oxide, polypropylene oxide, and composite polymers, crosslinked polymers, and modified polymers of these compounds. Fluorine-based polymers may also be used, and examples thereof include poly(vinylidene fluoride), poly(vinylidene fluoride-co-hexafluoropropylene), poly(vinylidene fluoride-co-trifluoroethylene), and mixtures of these compounds.

The electrolyte solution component is capable of dispersing the above-described polymer material. As an aprotic solvent, for example, ethylene carbonate (EC), propylene carbonate (PC), butylene carbonate (BC), or the like is used. As the electrolyte salt, an electrolyte salt that dissolves in the solvent is used, and it includes a combination of a cation and an anion. As the cation, an alkali metal or an alkaline earth metal is used. As the anion, $Cl^-$, $Br^-$, $I^-$, $SCN^-$, $ClO_4^-$, $BF_4^-$, $PF_6^-$, $CF_3SO_3^-$ or the like is used. As the electrolyte salt, specifically, lithium hexafluorophosphate or lithium tetrafluoroborate is used with a soluble concentration in the electrolyte solution.

<Outer Package>

FIGS. 4A to 4C are development views showing an example of a shape of an outer package 1 which covers the battery element 4. As shown in FIGS. 4A to 4C, the outer package 1 includes a soft laminate (first laminate) 1a provided with a housing part 15 for housing the battery element 4, and a hard laminate (second laminate) 1b which is overlaid on the soft laminate 1a so as to cover the housing part 15. Furthermore, a heat-weld sheet 15a is disposed on an outer surface at a position corresponding to a bottom of the housing part 15. The housing part 15 provided on the soft laminate 1a is, for example, formed into a recessed shape according to the shape of the battery element 4 by deep drawing in a die in advance.

The soft laminate 1a is suitable for forming by deep drawing the housing part 15 into which the battery element 4 is inserted and is softer than the hard laminate 1b.

Figure 5:
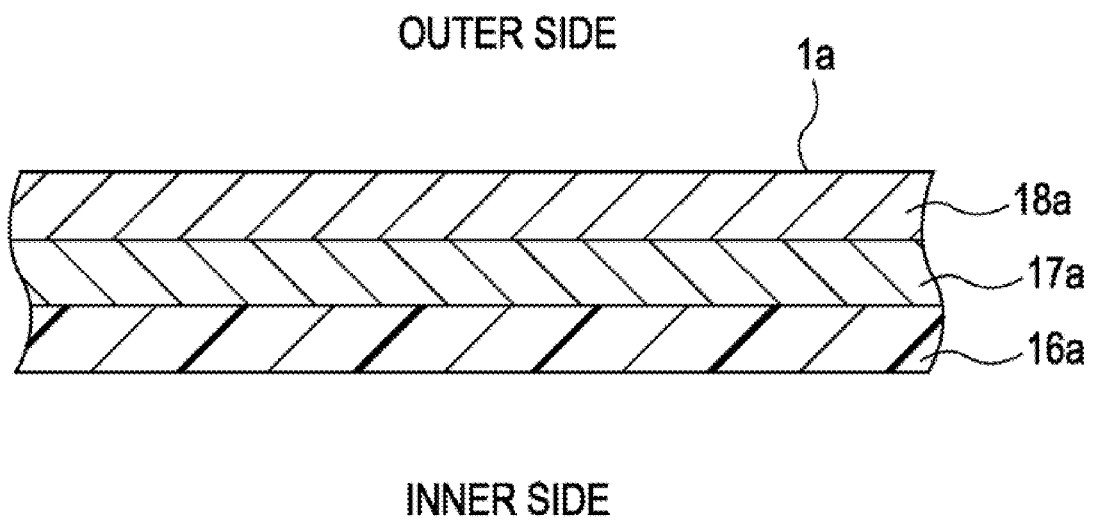
FIG. 5 is a cross-sectional view showing one structural example of a soft laminate constituting an outer package.

FIG. 5 is a cross-sectional view showing one structural example of the soft laminate 1a constituting the outer package 1. The soft laminate 1a has a layered structure in which a polypropylene (PP) layer 16a serving as an adhesion layer, a soft aluminum metal layer 17a serving as a conductive layer (metal layer), and a nylon layer or polyethylene terephthalate (PET) layer 18a serving as a surface protection layer are laminated in that order. The polypropylene layer 16a side corresponds to an inner side (to be in contact with the hard laminate 1b).

The polypropylene layer 16a has a function of preventing the degradation of the quality of the polymer electrolyte. As the polypropylene layer 16a, for example, cast polypropylene (CPP) or the like is used. The thickness of the polypropylene (PP) layer 16a is, for example, about 30 μm.

The soft aluminum metal layer 17a has a function of preventing moisture from entering the inside of the outer package 1. As a material for the soft aluminum metal layer 17a, for example, annealed aluminum (JIS A8021P-O) or (JIS A8079P-O) may be used. The thickness of the soft aluminum metal layer 17a is, for example, in a range of 30 to 130 μm. The nylon layer or PET layer 18a has a function of surface protection. The thickness of the nylon layer or PET layer 18a is, for example, in a range of about 10 to 30 μm. The soft aluminum metal layer 17a which is the conductive layer is electrically connected by the connecting member 30, such as a conductive tape, to the positive electrode lead 5a led from the battery element 4.

The hard laminate 1b can maintain the shape after folding and resist external deformation. The hard laminate 1b has a layered structure in which a polypropylene layer serving as an adhesion layer, a hard aluminum metal layer serving as a conductive layer (metal layer), and a nylon layer or PET layer serving as a surface protection layer are laminated in that order.

The polypropylene layer and the nylon layer or PET layer of the hard laminate 1b are the same as those of the soft laminate 1a. The hard aluminum metal layer is, for example, composed of unannealed aluminum (JIS A3003P-H18) or (JIS A3004P-H18). The thickness of the hard aluminum metal layer is, for example, in a range of about 30 to 130 μm. The thickness of the individual layers in each of the soft laminate 1a and the hard laminate 1b is set appropriately in view of the total thickness.

The hard laminate 1b is overlaid on the soft laminate 1a so as to cover an open surface of the housing part 15. In this case, as shown in FIG. 4A, the soft laminate 1a and the hard laminate 1b are shifted from each other in terms of positional relationship. The soft laminate 1a has a top long side 11a and a bottom long side 12a having the same length, and a left short side 13a and a right short side 14a having the same length. Similarly, the hard laminate 1b has a top long side 11b and a bottom long side 12b having the same length and a left short side 13b and a right short side 14b having the same length. Here, right and left correspond to right and left in the drawing.

The length of each of the long sides 11b and 12b of the hard laminate 1b is set such that the short sides 13b and 14b of the hard laminate 1b butt against each other or face each other with a small space therebetween when the hard laminate 1b is folded around the housing part 15 containing the battery element 4. The length of each of the long sides 11a and 12a of the soft laminate 1a is set to be shorter than the length of each of the long sides 11b and 12b of the hard laminate 1b and, for example, such that the short sides 13a and 14a butt against each other or face each other with a space therebetween when the soft laminate 1a is folded around the housing part 15 containing the battery element 4. Here, the space between the short sides 13a and 14a of the soft laminate 1a is not necessarily small, but may be large to a certain degree.

The short sides 13a and 14a of the soft laminate 1a are slightly shorter than the short sides 13b and 14b of the hard laminate 1b. Consequently, it is possible to laminate the soft laminate 1a and the hard laminate 1b such that only the hard laminate 1b is present on the top side. In such a case, advantageously, the periphery of the top cover 2 provided on the opening on the top side can be heat-welded with the polypropylene layer of the hard laminate 1b. Furthermore, the adhesion layer of the hard laminate 1b may be arranged so as to be exposed at the bottom side so that the periphery of the bottom cover 3 provided on the opening on the bottom side can be heat-welded with the polypropylene layer of the hard laminate 1b.

Figure 6A:
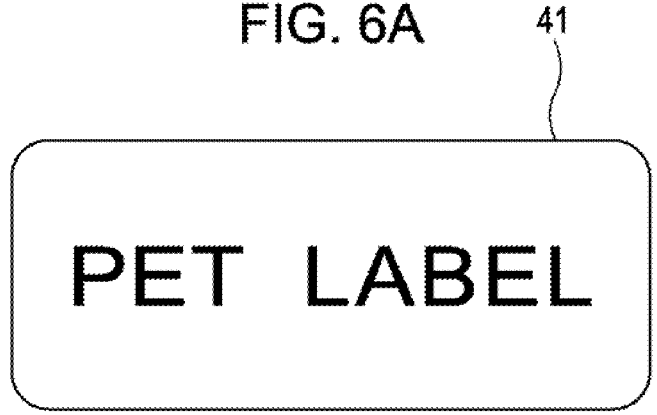
FIGS. 6A to 6C are views showing one structure of a label covering the surface of an outer package.
Figure 6B:
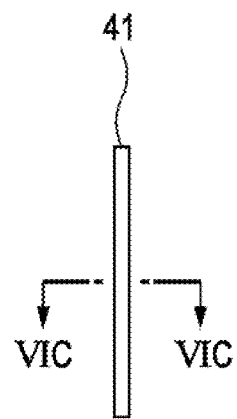
Figure 6C:
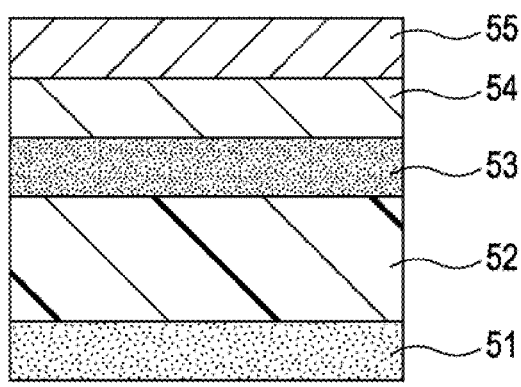

FIGS. 6A to 6C are views showing one structure of a label 41 covering the surface of the outer package 1. The label 41 is a marker sheet, for example, used in order to display characters, figures, etc., more specifically, information on handling, standards for safety, etc. on the surface of the outer package 1. As shown in FIG. 6C, the label 41 includes a film-shaped or sheet-shaped substrate 52; an ink adhesive layer 53, an ink layer 54, and a UV coating layer 55 laminated in that order on one principal surface of the substrate 52; and an adhesive layer 51 laminated on another principal surface. As the substrate 52, for example, a PET substrate containing polyethylene terephthalate (PET) as a main component may be used, although not particularly limited thereto. The substrate 52 may be selected appropriately depending on the characteristics of the desired label 41. The label 41 is bonded through the adhesive layer 51 to the outer package 1. Hereinafter, a label 41 including a substrate 52 composed of a PET substrate is referred to as a "PET label".

Figure 7A:
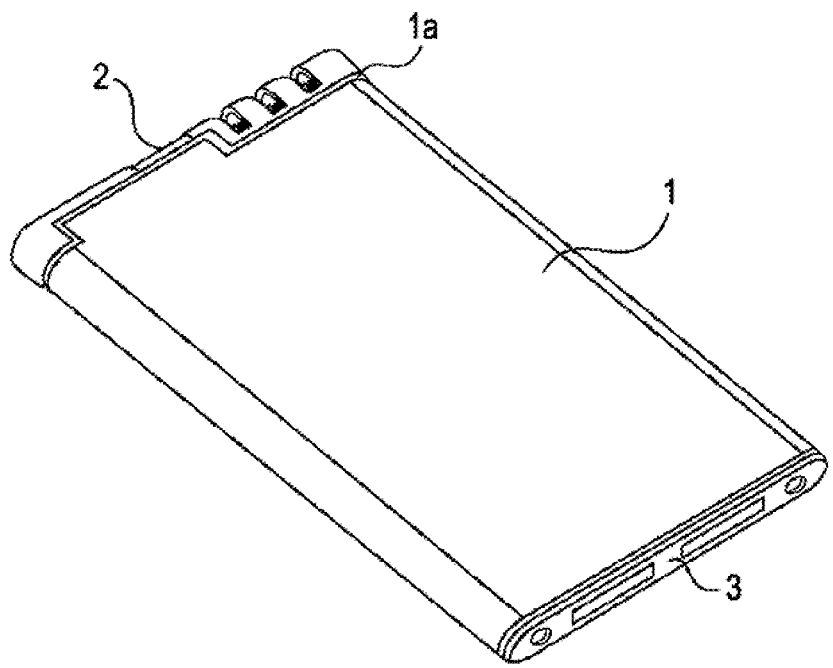
FIG. 7A is a perspective view showing a battery pack in which a metal of an outer package is exposed.
Figure 7B:
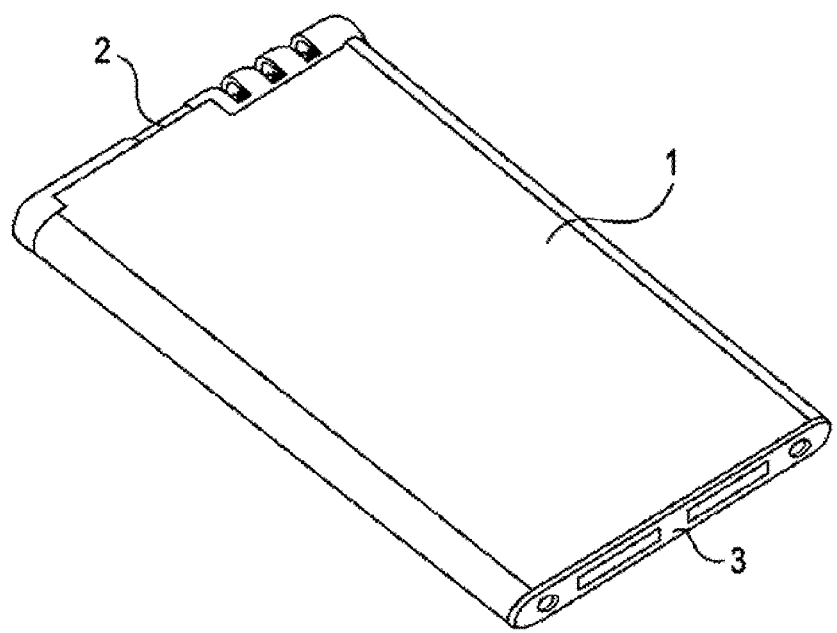
FIG. 7B is a perspective view showing a battery pack in which a metal of an outer package is not exposed.

As shown in FIG. 7A, when the metal of the outer package 1 is exposed, there is a possibility that static electricity due to ESD may flow through the exposed portion into the circuit board of the electronic device disposed in the vicinity of the battery pack housing part. Therefore, in the battery pack according to the first embodiment, preferably, as shown in FIG. 7B, the entire surface of the outer package 1 is covered with the label 41 so that the metal of the outer package 1 is not exposed. Thereby, it is possible to further suppress a malfunction, failure, etc. of the electronic device due to ESD.

<Top Cover>

The top cover 2 is fitted into the top opening of the outer package 1 to close the top opening. The top cover 2 includes a top cover body 21, a circuit board 22, a relay tab 23, a fuse 24, a positive electrode tab 25, a negative electrode tab 26, and a holder 27. The top cover 2 has a housing part on the surface thereof facing the battery element 4. The housing part houses the circuit board 22, the relay tab 23, the fuse 24, the positive electrode tab 25, and the negative electrode tab 26. These components are held in the top cover body 21 when the holder 27 is fitted into the top cover body 21. Furthermore, an insulating tape 28 and an insulating tape 29 may be disposed between the top cover 2 and the outer package 1.

The positive electrode lead 5a led from the battery element 4 is connected through the positive electrode tab 25 to the circuit board 22. The negative electrode lead 5b led from the battery element 4 is connected through the negative electrode tab 26, the fuse 24, and the relay tab 23 to the circuit board 22.

A protection circuit containing a temperature protection element, such as a fuse 24, a positive temperature coefficient (PTC) element, or a thermistor, and an ID resistor for identifying the battery pack are mounted on the circuit board 22. The protection circuit is provided with an integrated circuit (IC) for monitoring the secondary battery and controlling field effect transistors (FETs), and charge/discharge control FETs.

The PTC element is connected in series to the battery element 4. The electric resistance of the PTC element sharply increases when the temperature of the battery element 4 becomes higher than the preset temperature, and thereby, current flowing into the battery element 4 is substantially interrupted. The fuse 24 or the thermistor is also connected in series to the battery element 4. When the temperature of the battery element 4 becomes higher than the preset temperature, current flowing into the battery element 4 is interrupted. The protection circuit, which includes the IC for monitoring the battery element 4 and controlling the FETs, and charge/discharge control FETs, monitors the voltage of the battery element 4 since there is a possibility that a dangerous state, such as heat generation and ignition, may occur if the terminal voltage of the battery element 4 exceeds, for example, 4.3 to 4.4 V. The protection circuit turns off the charge control FET when the voltage exceeds, for example, 4.3 to 4.4 V, thus inhibiting charging. If the terminal voltage of the battery element 4 is decreased to the discharge prohibition voltage or less due to over-discharging and the secondary battery voltage becomes 0 V, an internal short-circuit state of the battery element 4 may be brought about, resulting in incapability of recharging. Therefore, the protection circuit monitors the secondary battery voltage and turns off the discharge control FET when the voltage becomes lower than the discharge prohibition voltage, thus inhibiting discharging.

<Bottom Cover>

The bottom cover 3 closes the opening on the bottom side of the outer package 1. The bottom cover 3 includes a bottom cover body 31 and a bottom plate 32. The bottom plate 32 is disposed between the bottom cover body 31 and the battery element 4. The bottom cover body 31 is provided with one or two or more through-holes used for injection of a molten resin between the bottom cover 3 and the battery element.

(1-2) Method of Fabricating Battery Pack

An example of a method of fabricating a battery pack according to the first embodiment will be described below.
<Battery Element Formation Step>

First, a positive electrode and a negative electrode, each having gel electrolyte layers on both surfaces thereof, and separators are prepared. The negative electrode, the separator, the positive electrode, and the separator are laminated in that order, and the resulting laminate is folded around a flat core plate and wound many times in the longitudinal direction. A winding-type battery element 4 is thereby formed.
<Outer Package Covering Step>

Next, a housing part 15 for housing the battery element 4 is formed in a soft laminate 1a by deep drawing in advance. In this process, as shown in FIG. 4A, the housing part 15 of the soft laminate 1a is formed, for example, at a position slightly shifted from the center toward the right side. Then, the battery element 4 is placed in the housing part 15 formed in the soft laminate 1a.

Next, as shown in FIG. 4A, the hard laminate 1b is laminated on the soft laminate 1a at a position slightly shifted from the center toward the right side. Accordingly, in the state in which the soft laminate 1a and the hard laminate 1b are laminated, as shown in FIG. 4A, there are a left side region where only the soft laminate 1a is located and a right side region where only the hard laminate 1b is located. The reason for such a shift in position is that, as will be described later, after the ends of the soft laminate 1a and the hard laminate 1b are folded toward the outside of the bottom of the housing part 15 of the soft laminate 1a, the polypropylene layer of the soft laminate 1a and the polypropylene layer of the hard laminate 1b can be bonded to each other at a certain width.

Next, in the positional state shown in FIG. 4A, four sides of the housing part 15 in the periphery of the opening are heat-welded under reduced pressure. In this case, the entire portion where the polypropylene layers overlie each other may be heat-welded. By heat-welding the periphery of the housing part 15 in such a manner, the battery element 4 is sealed.

Next, as shown in FIG. 4A, a heat-weld sheet 15a having a predetermined shape is provided on the outside of the bottom of the housing part 15. The heat-weld sheet 15a is an auxiliary member for bonding together the nylon layers or PET layers of the soft laminate 1a by applying high temperature. Preferably, the thickness of the heat-weld sheet 15a is about 10 to 60 μm in view of the total thickness, and the melting point of the heat-weld sheet 15a is about 100° C. It is desirable to set the melting point of the heat-weld sheet 15a to a value that does not thermally affect the battery element 4.

Figure 8:
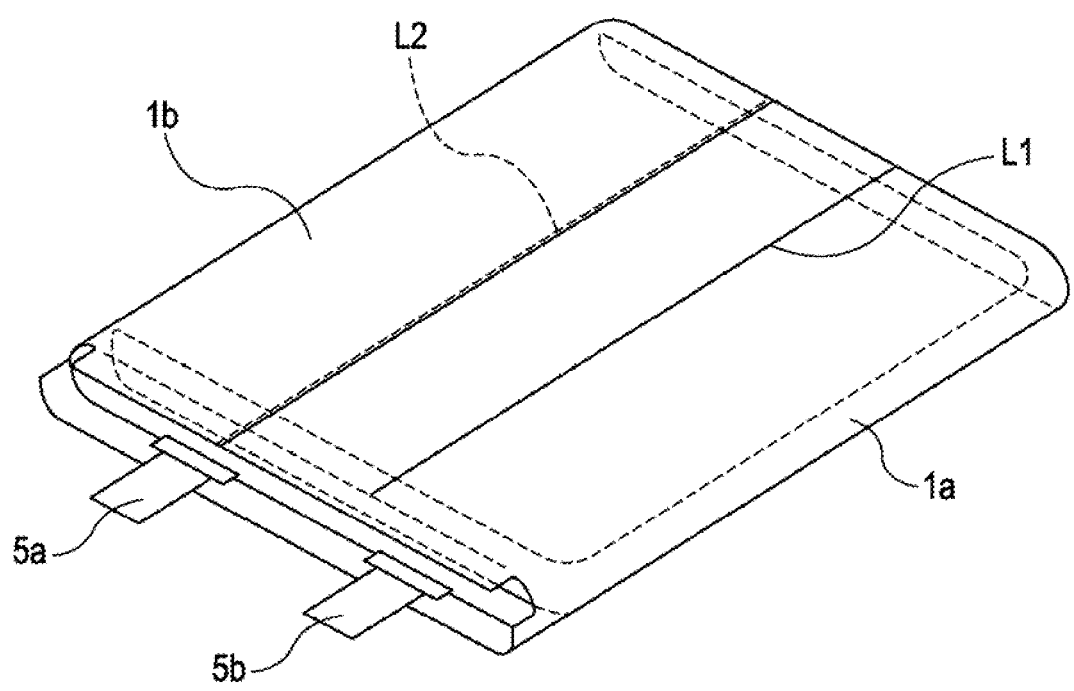
FIG. 8 is a perspective view showing one structural example of a battery element covered with an outer package.

Next, as shown in FIG. 8, both ends of each of the soft laminate 1a and the hard laminate 1b are folded toward the outside of the bottom of the housing part 15 of the soft laminate 1a. That is, the short sides 13a and 14a and the short sides 13b and 14b are folded inward. The ends of each of the soft laminate 1a and the hard laminate 1b are heat-welded, and the soft laminate 1a is heat-welded to the outside of the bottom of the housing part 15. Thereby, the soft laminate 1a and the hard laminate 1b are fixed in a closed state so as to wrap the housing part 15 containing the battery element 4. That is, a top opening and a bottom opening are formed.

As shown in FIG. 9, in the state in which the battery element 4 is wrapped, the shorts sides 13b and 14b of the hard laminate 1b are in contact with each other or face each other with a small space therebetween to form a joint L1. In the inner side of the hard laminate 1b, the short sides 13a and 14a are in contact with each other or face each other with a small space therebetween to form a joint L2. In FIG. 9, reference symbol 16b represents the polypropylene layer of the hard laminate 1b, reference symbol 17b represents the hard aluminum metal layer, and the reference symbol 18b represents the nylon layer or PET layer. In this example, the short sides 13a and 14a of the soft laminate 1a are in contact with each other or face each other with a small space therebetween. However, the short sides 13a and 14a of the soft laminate 1a may face each other with a space having a certain width therebetween.

As shown in FIG. 9, the nylon layer or PET layer 18a of the soft laminate 1a is located in contact with the upper side of the heat-weld sheet 15a. Consequently, the nylon layers or PET layers 18a sandwich the heat-weld sheet 15a, and by applying heat from outside, the nylon layers or PET layers 18a can be bonded to each other. Furthermore, since the polypropylene layer 16a of the soft laminate 1a and the polypropylene layer 16b of the hard laminate 1b are in contact with each other, by applying heat from outside, the polypropylene layers 16a and 16b can be bonded to each other.
<Cover Fitting Step>

Figure 10A:
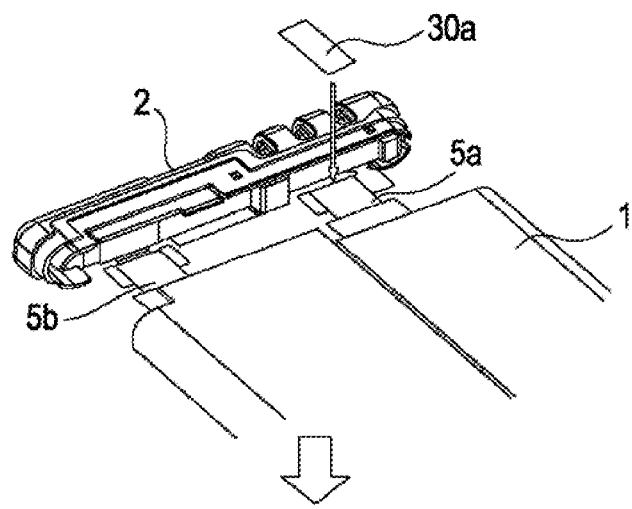
FIGS. 10A to 10D are perspective views showing steps in a method of fabricating a battery pack.
Figure 10B:
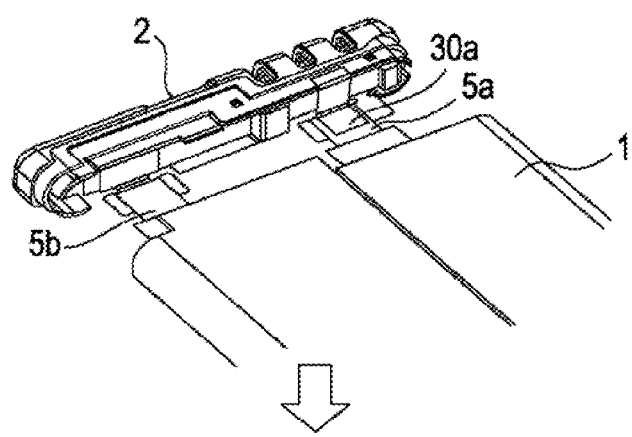
Figure 10C:
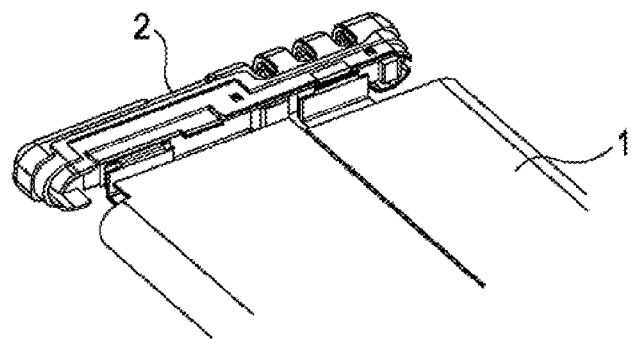
Figure 10D:
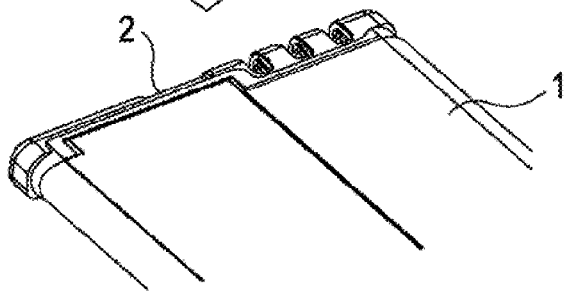

Next, the positive electrode lead 5a, the negative electrode lead 5b, etc. are connected to the circuit board 22, etc., for example, by resistance welding or ultrasonic welding, and the individual components of the top cover 2 are assembled. Thereby, the top cover 2 is obtained. Next, as shown in FIG. 10A, one end of a conductive tape 30a is connected to the positive electrode lead 5a led from the battery element 4. Then, as shown in FIG. 10B, another end of the conductive tape 30a is placed on the upper surface of the top cover 2. Next, as shown in FIG. 10C, while appropriately folding the positive electrode lead 5a and the negative electrode lead 5b, the top cover 2 is fitted into the top opening of the outer package 1. Thereby, as shown in FIG. 10D, the top opening of the outer package 1 is closed by the top cover 2, and the other end of the conductive tape 30a is held between the top cover 2 and the hard laminate 1b. When the top cover 2 is fitted into the top opening of the outer package 1, insulating tapes 28 and 29 may be placed between the top cover 2 and the outer package 1. Next, the individual components of the bottom cover 3 are assembled to form the bottom cover 3. The bottom cover 3 is fitted into the bottom opening of the outer package 1.
<Heat-Welding Step>

Next, heat welding is performed while using jigs to hold the overall length. That is, heater blocks composed of a metal, such as copper, are pressed against the upper and lower sides of the vicinity of the top end of the outer package 1, and the periphery of the top cover 2 and the polypropylene layer inside the hard laminate 1b are heat-welded. Thereby, the polypropylene layer is melted and the other end of the conductive tape 30a held between the upper surface of the top cover 2 and the outer package 1 is electrically connected to the hard aluminum metal layer. Similarly, heater blocks may be pressed against the upper and lower sides of the vicinity of the bottom end of the outer package 1, and the periphery of the bottom cover 3 and the polypropylene layer inside the hard laminate 1b may be heat-welded.

\<Resin Injection Step\>

A molten resin is injected, through the through-holes, between the battery element 4 and the bottom cover 3, followed by solidification. Thereby, the bottom cover 3 is bonded to the end face of the battery element 4. The resin to be injected is not particularly limited as long as it has a low viscosity during injection. Examples of the resin that can be used include polyamide-based hot melt, polyolefin-based hot melt, nylon, PP, PC, and ABS.

Furthermore, a molten resin may be injected between the top cover 2 and the battery element 4. In such a case, one or two or more through-holes are provided on the top cover 2, and the molten resin is injected through the through-holes.

By performing the steps described above, the battery pack according to the first embodiment of the present invention is fabricated.

Figure 11:
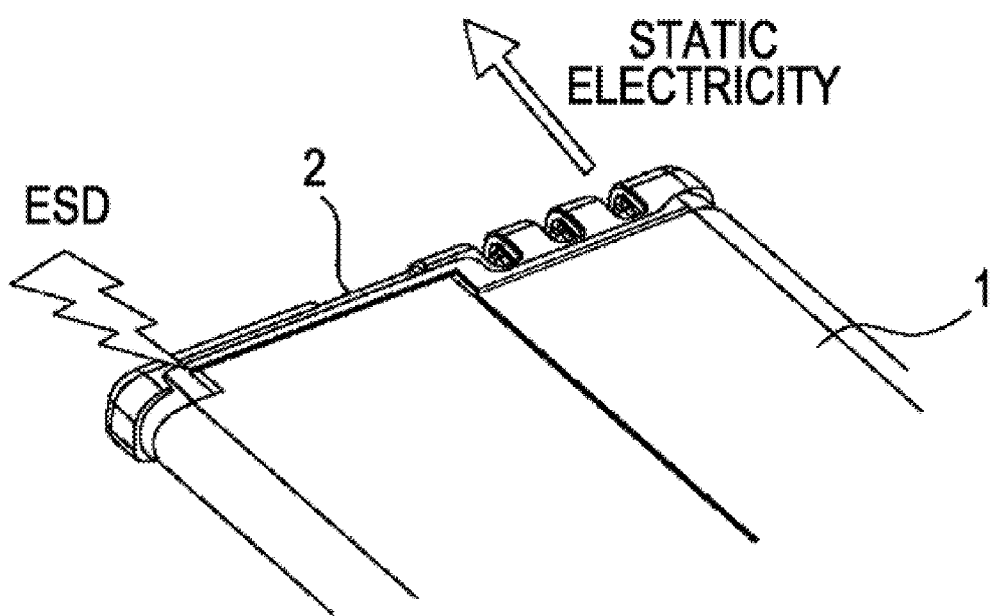
FIG. 11 is a perspective view showing a flow of static electricity when ESD occurs.
Figure 12:
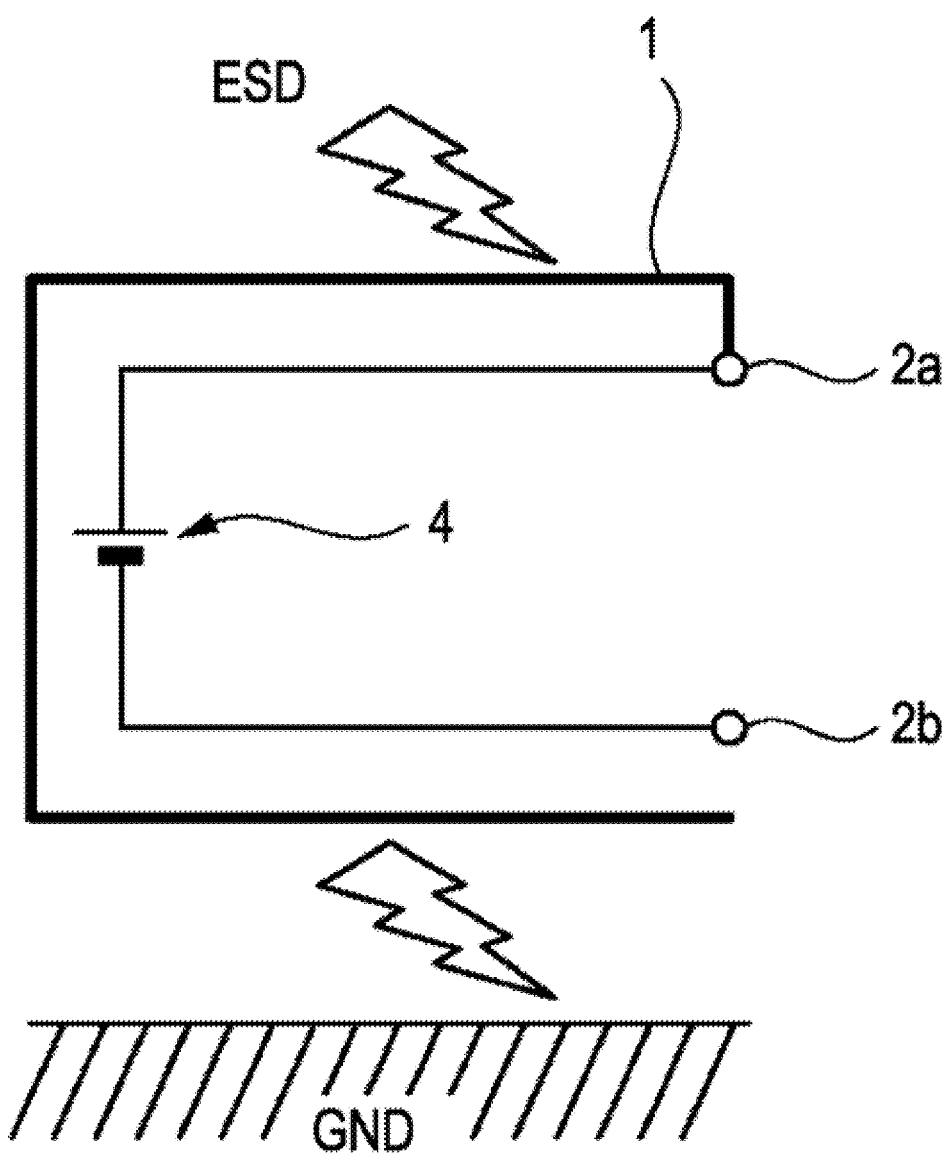
FIG. 12 is an equivalent circuit diagram showing a flow of static electricity when ESD occurs.

FIG. 11 shows a flow of static electricity when ESD occurs. FIG. 12 is an equivalent circuit diagram showing a flow of static electricity when ESD occurs. A case where ESD occurs and static electricity enters the outer package 1 as shown in FIG. 11 will be described below.

When the conductive layer of the outer package 1 is set to have a positive electric potential, static electricity entering the outer package 1 flows in the charging direction of the battery element 4. Therefore, static electricity is assumed to be attenuated through the battery element 4. Consequently, the influence on the casing containing the battery pack is decreased by an amount equivalent to the amount of static electricity charged to (absorbed by) the battery element 4. Part of static electricity may flow into GND of the casing. In such a case, the part is separated from the remaining part of static electricity that enters the battery element 4, and therefore, the influence on the casing containing the battery pack is decreased.

A substance is composed of atoms or molecules, and a molecule is composed of one or a plurality of atoms. An atom has a structure in which electrically negative electrons surround the nucleus (positive protons). Outer-shell electrons are in a state being easily detached. A substance which easily releases outer-shell electrons is a substance that is easily positively charged, and a substance which easily attracts electrons into the outer shell is a substance that is easily negatively charged. In terms of flow of electricity, there is no difference between being positively charged and being negatively charged. Therefore, the charge polarity with respect to ESD is not particularly described here.

According to the first embodiment, since the positive electrode lead 5a of the battery element 4 and the conductive layer of the outer package 1 are electrically connected to each other, the outer package 1 can be set to have a positive electric potential. When the outer package 1 is set to have a positive electric potential instead of being neutral, static electricity flowing into the battery pack flows in the charging direction of the battery element 4. Therefore, static electricity is assumed to be attenuated through the battery element 4. Consequently, it is possible to prevent static electricity from flowing into the circuit board of the electronic device disposed in the vicinity of the battery pack housing part in an amount equivalent to the amount of static electricity charged to (absorbed by) the battery element 4.

Furthermore, when the positive electrode lead 5a of the battery element 4 and the conductive layer of the outer package 1 are electrically connected to each other, ESD tolerance can be further improved compared with the case where the negative electrode lead 5b of the battery element 4 and the conductive layer of the outer package 1 are electrically connected to each other. In particular, the difference in the effect is noticeable in a region where the ESD voltage exceeds ±15 kV.

Furthermore, it is possible to improve ESD tolerance only by slightly changing the structure of the battery pack. Consequently, ESD tolerance can be improved without changing the design of the casing of an electronic device, such as a mobile phone. That is, measures against static electricity can be implemented regardless of the structure of the casing of the electronic device.

Furthermore, since the outer package 1 is charged, instead of being neutral, static electricity is not discharged to (diffused into) the circuit board of the electronic device. It is also possible to prevent static electricity, which is discharged through the openings of the casing of the electronic device, from causing functional failure, etc. in the electronic device through the battery pack. Furthermore, by decreasing the contact resistance between the metal layer of the outer package 1 and the positive electrode terminal 2a or the negative electrode terminal 2b of the battery pack, preferably, to 1 MΩ or less, static electricity diffusion can be suppressed. Consequently, ESD tolerance can be improved regardless of the structure of the casing of the electronic device.

(2) Second Embodiment

A battery pack according to a second embodiment differs from that of the first embodiment in that the negative electrode lead 5b of the battery element 4 and the conductive layer of the outer package 1 are electrically connected to each other. Preferably, the resistance R between the negative electrode terminal 2b of the battery pack and the metal layer of the outer package 1 is set at 500Ω or less. Thereby, ESD tolerance can be further improved.

Figure 13A:
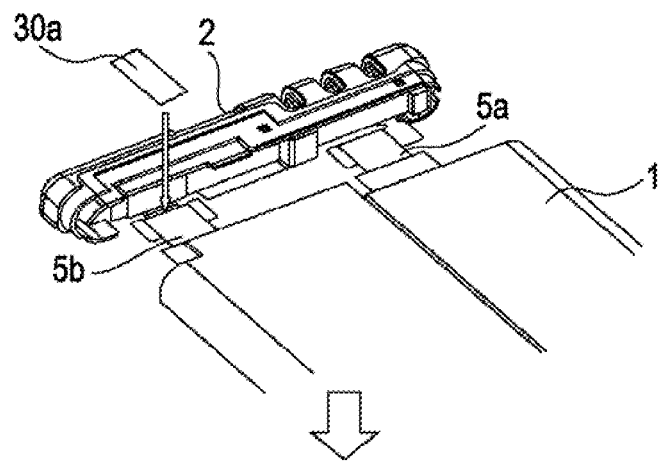
FIGS. 13A to 13D are perspective views showing steps in a method of fabricating a battery pack.
Figure 13B:
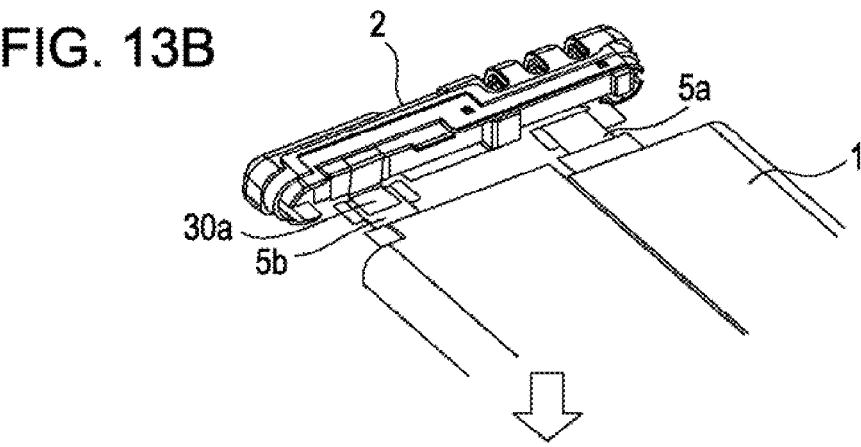
Figure 13C:
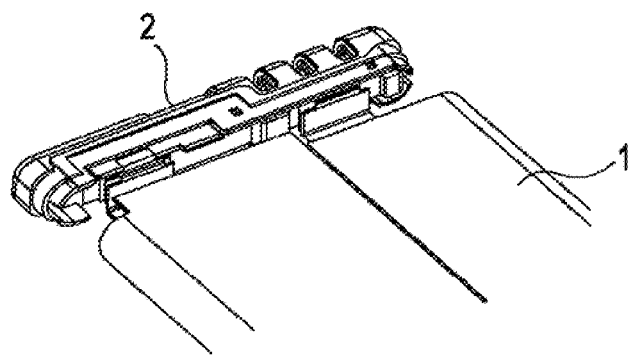
Figure 13D:
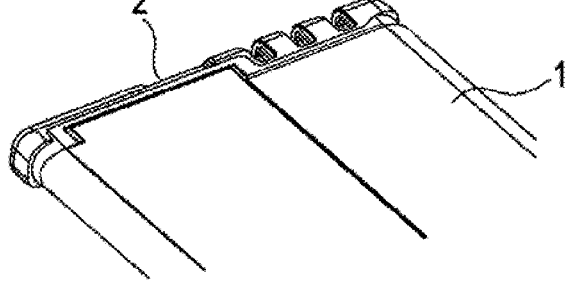

FIGS. 13A to 13D show an example of joining of a negative electrode lead 5b of a battery element 4 and a hard aluminum metal layer (metal layer) of an outer package 1. First, as shown in FIG. 13A, one end of a conductive tape 30a is connected to the negative electrode lead 5b led from the battery element 4. Next, as shown in FIG. 13B, another end of the conductive tape 30a is placed on the upper surface of the top cover 2. Next, as shown in FIG. 13C, while appropriately folding the positive electrode lead 5a and the negative electrode lead 5b, the top cover 2 is fitted into the top opening of the outer package 1. Thereby, as shown in FIG. 13D, the top opening of the outer package 1 is closed by the top cover 2, and the other end of the conductive tape 30a is held between the top cover 2 and the hard laminate 1b.

Next, heat welding is performed while using jigs to hold the overall length. That is, heater blocks composed of a metal, such as copper, are pressed against the upper and lower sides of the vicinity of the top end of the outer package 1, and the periphery of the top cover 2 and the polypropylene layer inside the hard laminate 1b are heat-welded. Thereby, the polypropylene layer is melted and the other end of the conductive tape 30a held between the upper surface of the top cover 2 and the outer package 1 is electrically connected to the hard aluminum metal layer.

Figure 14:
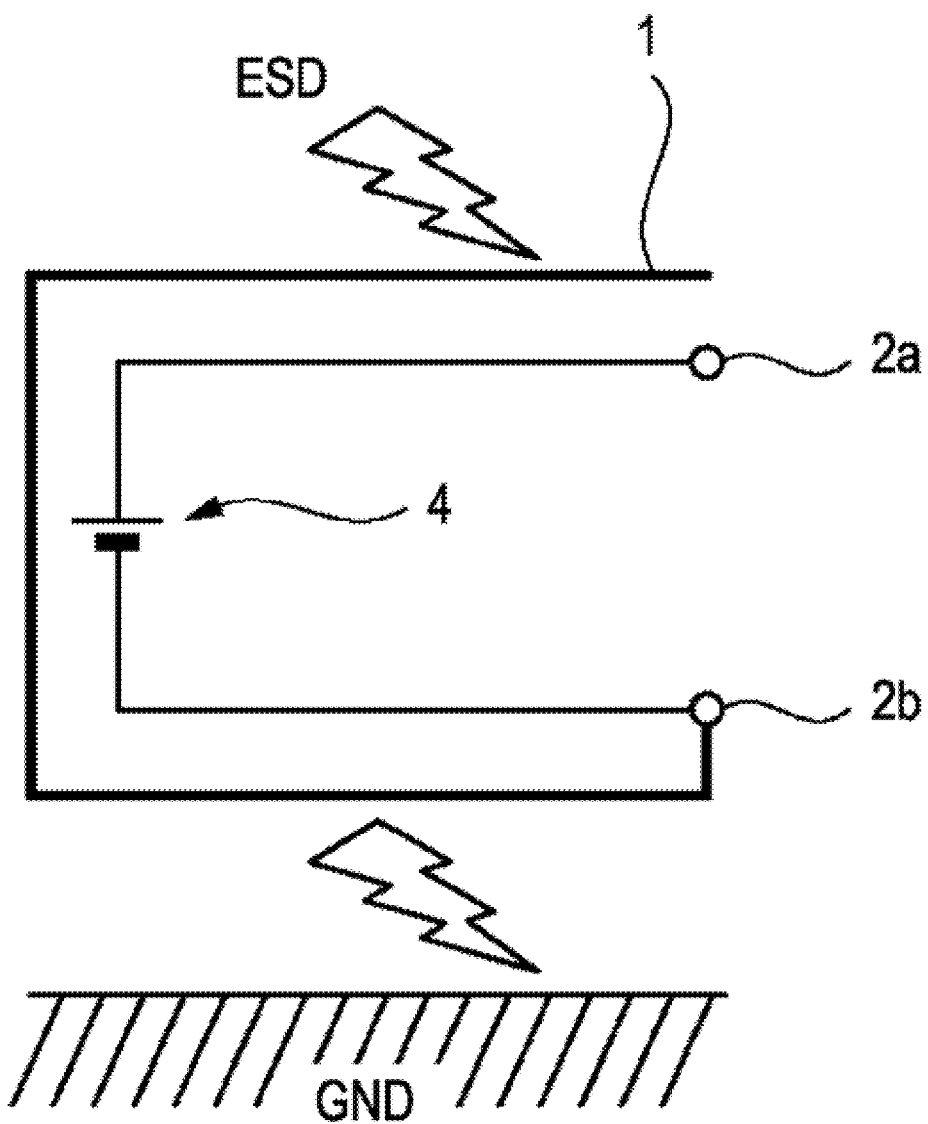
FIG. 14 is an equivalent circuit diagram showing a flow of static electricity when ESD occurs.

FIG. 14 is an equivalent circuit diagram showing a flow of static electricity when ESD occurs. When the conductive layer of the outer package 1 is set to have a negative electric potential, static electricity entering the outer package 1 flows in the discharging direction of the battery element 4. Therefore, static electricity is believed to be reflected without passing through the battery element 4. Consequently, the influence on the casing containing the battery pack is large.

However, in this method, if the electric potential on the casing side is set to be a negative potential without a gap (space) between the conductive layer of the outer package 1 and the casing of the body, discharging occurs between the outer package 1 and ESD of the casing of the body, which is effective as the measure.

According to the second embodiment, since the negative electrode lead 5b of the battery element 4 and the conductive layer of the outer package 1 are electrically connected to each other, the outer package 1 can be set to have a negative electric potential. When the outer package 1 is set to have a negative electric potential, static electricity due to ESD flows in the discharging direction of the battery element 4. Therefore, static electricity is assumed to flow into the negative electrode terminal of the electronic device without passing through the battery element 4. Consequently, it is possible to prevent static electricity from flowing into the circuit board of the electronic device disposed in the vicinity of the battery pack housing part.

(3) Third Embodiment

FIG. 15 is an exploded perspective view showing one structural example of a battery pack according to a third embodiment of the present invention. As shown in FIG. 15, the battery pack differs from that of the first embodiment in that a metal label 61 is used as the label.

The metal label 61 is a marker sheet, for example, used in order to display characters, figures, etc., more specifically, information on handling, standards for safety, etc. on the surface of the outer package 1 and in order to improve the outer package strength of the battery pack. The metal label 61 includes at least a substrate containing a metal as a main component. Preferably, the mechanical strength of the metal label 61 is higher than the mechanical strength of the outer package 1 from the standpoint that the mechanical strength of the entire battery pack can be improved. The metal label 61 is, for example, attached to the outside of the outer package 1. The size of the metal label 61 is not particularly limited. Although the metal label 61 may be smaller than the outer package 1, the metal label 61 preferably has substantially the same size as the outer package 1 from the standpoint of improving the outer package strength of the battery pack.

Figure 16A:
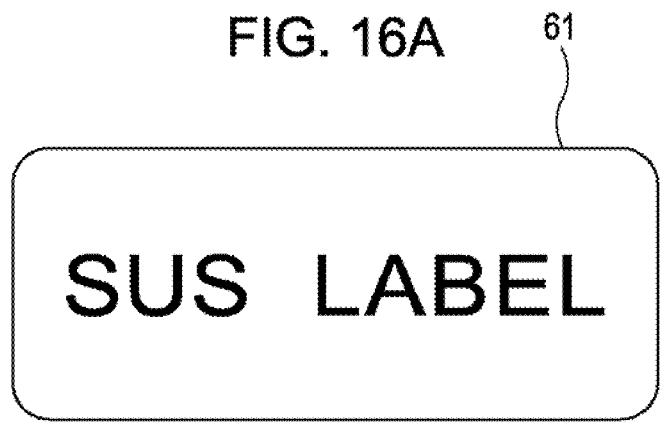
FIGS. 16A to 16C are views showing a first structural example of a metal label.
Figure 16B:
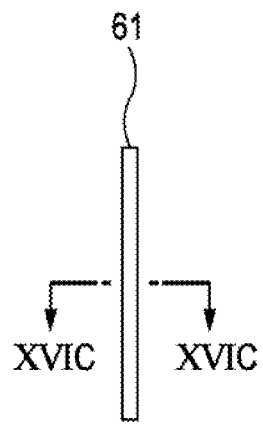
Figure 16C:
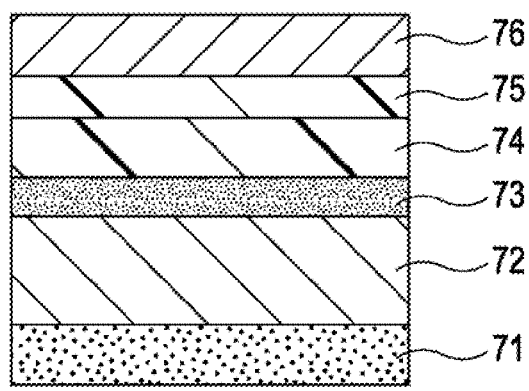

FIGS. 16A to 16C show a first structural example of the metal label. As shown in FIG. 16C, a metal label 61 includes a film-shaped or sheet-shaped metal substrate 72; an adhesive layer 73, a resin substrate 74, an ink layer 75, and a UV coating layer 76 laminated in that order on one principal surface of the metal substrate 72; and an adhesive layer 71 laminated on another principal surface. As the metal substrate 72, an SUS substrate containing SUS as a main component is preferably used, although not particularly limited thereto. The metal substrate 72 may be selected appropriately depending on the characteristics of the desired metal label 61. As the resin substrate 74, for example, a PET substrate containing polyethylene terephthalate (PET) as a main component may be used, although not particularly limited thereto. The resin substrate 74 may be selected appropriately depending on the characteristics of the desired metal label 61. The metal label 61 is bonded through the adhesive layer 71 to the outer package 1. Hereinafter, a metal label 61 including a metal substrate 72 composed of an SUS substrate is referred to as a "SUS label".

Figure 17A:
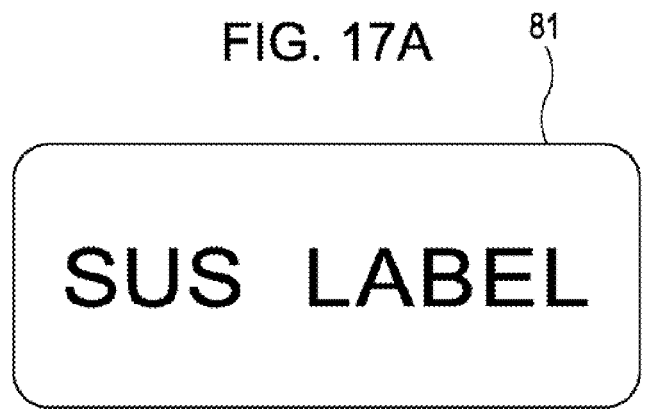
FIGS. 17A to 17C are views showing a second structural example of a metal label.
Figure 17B:
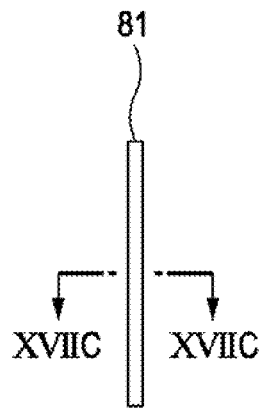
Figure 17C:
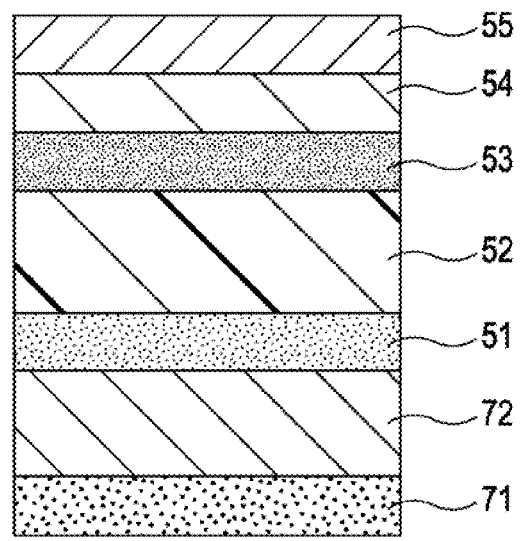

FIGS. 17A to 17C show a second structural example of the metal label. As shown in FIG. 17C, a metal label 81 includes a film-shaped or sheet-shaped metal substrate 72; an adhesive layer 51, a substrate 52, an ink adhesive layer 53, an ink layer 54, and a UV coating layer 55 laminated in that order on one principal surface of the metal substrate 72; and an adhesive layer 71 laminated on another principal surface.

According to the third embodiment, since the metal label 61 is provided on the surface of the outer package 1, the mechanical strength of the entire battery pack can be improved.

(4) Fourth Embodiment

A fourth embodiment differs from the third embodiment in that the metal substrate 72 of the metal label 61 is electrically connected to the positive electrode lead 5a of the battery element 4, instead of electrically connecting the conductive layer of the outer package 1 to the positive electrode lead 5a of the battery element 4.

FIG. 18 shows a structural example of a battery pack according to the fourth embodiment of the present invention. As shown in FIG. 18, an outer package 1 has an opening 65 in the vicinity of the top opening, and the metal substrate 72 of the metal label 61 is exposed through the opening 65. The exposed portion and the positive electrode terminal 63 of the circuit board 22 are electrically connected to each other by a connecting member 62. As the connecting member 62, the same connecting member as the connecting member 30 in the third embodiment can be used. The positive electrode terminal 63 can be electrically connected to a positive electrode terminal 64 of an electronic device housing the battery pack.

According to the fourth embodiment, as shown in FIG. 18, since the positive electrode terminal 63 of the circuit board 22 and the metal substrate 72 of the metal label 61 are electrically connected to each other by the connecting member 62, the metal label 61 can be set to have a positive electric potential. When the metal label 61 is set to have a positive electric potential, static electricity flowing into the battery pack flows in the charging direction of the battery element 4. Therefore, static electricity is assumed to be attenuated through the battery element 4. Consequently, it is possible to prevent static electricity from flowing into a circuit board 91 disposed in the vicinity of the battery pack housing part of the electronic device in an amount equivalent to the amount of static electricity charged to (absorbed by) the battery element 4.

Figure 19:
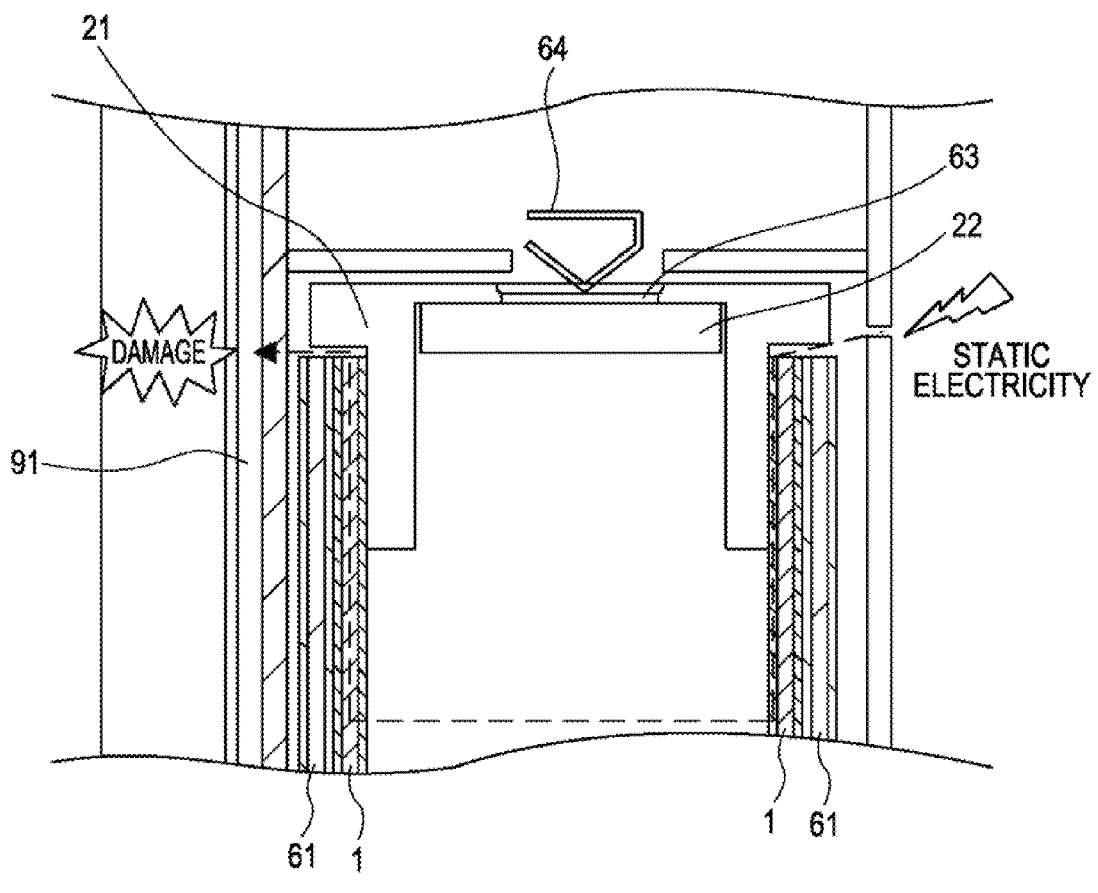
FIG. 19 is a cross-sectional view used for describing the advantageous effect of the battery pack according to the fourth embodiment.

In contrast, as shown in FIG. 19, in the case where the positive electrode terminal 63 of the circuit board 22 and the metal substrate 72 of the metal label 61 are not electrically connected each other by the connecting member 62, static electricity flows into the circuit board 91 disposed in the vicinity of the battery pack housing part of the electronic device.

EXAMPLES

Figure 20:
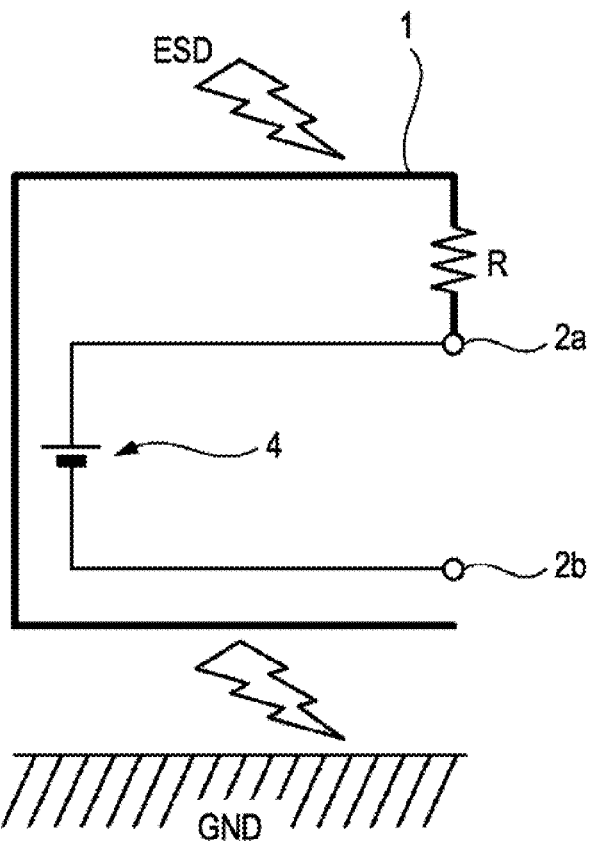
FIG. 20 is an equivalent circuit diagram of a battery pack in each of Examples 1 to 5.
Figure 21:
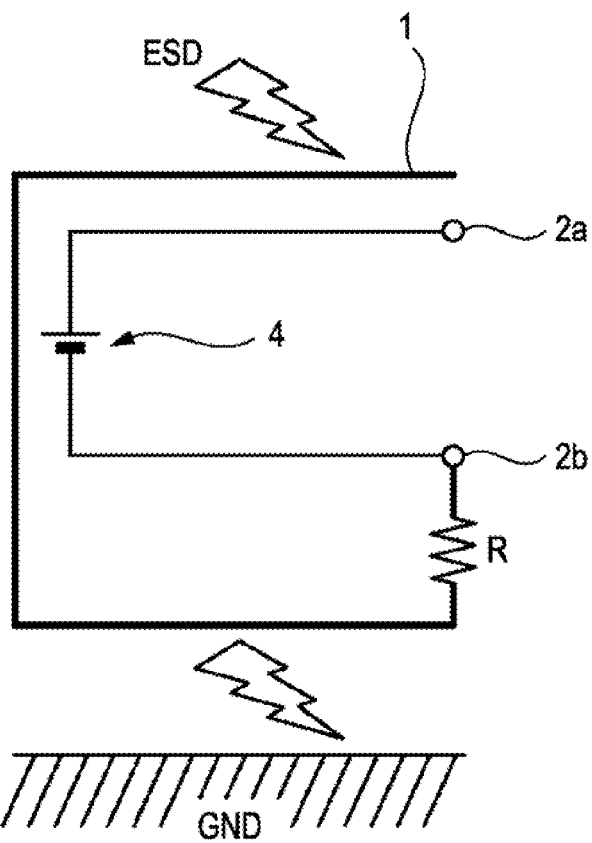
FIG. 21 is an equivalent circuit diagram of a battery pack in each of Examples 6 to 10.
Figure 22A:
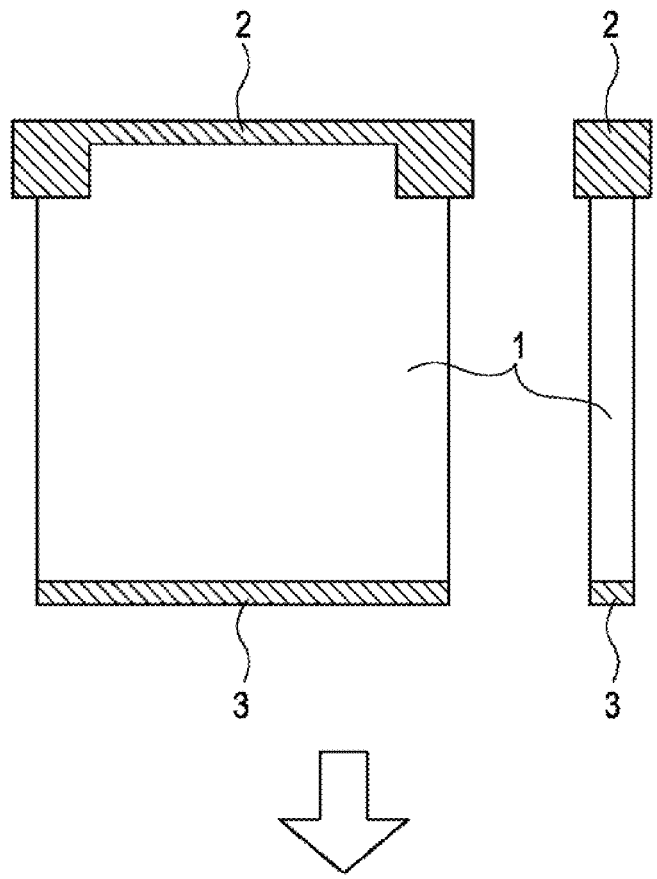
FIGS. 22A and 22B are schematic views used for describing a free fall drop test and a random free fall drop test for a battery pack in Example 11.
Figure 22B:
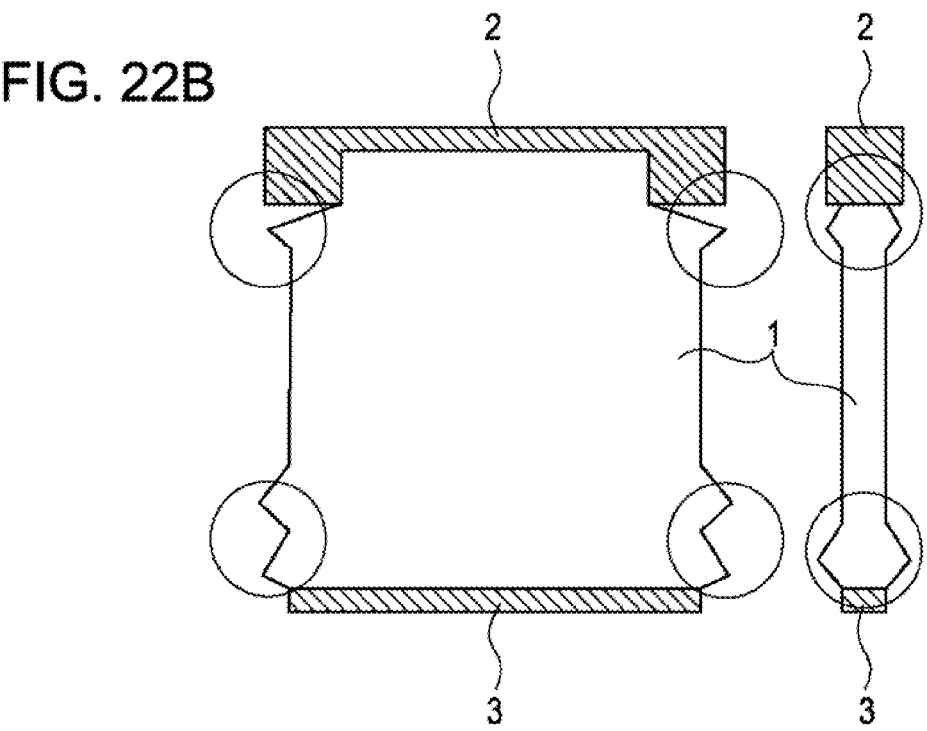
Figure 24A:
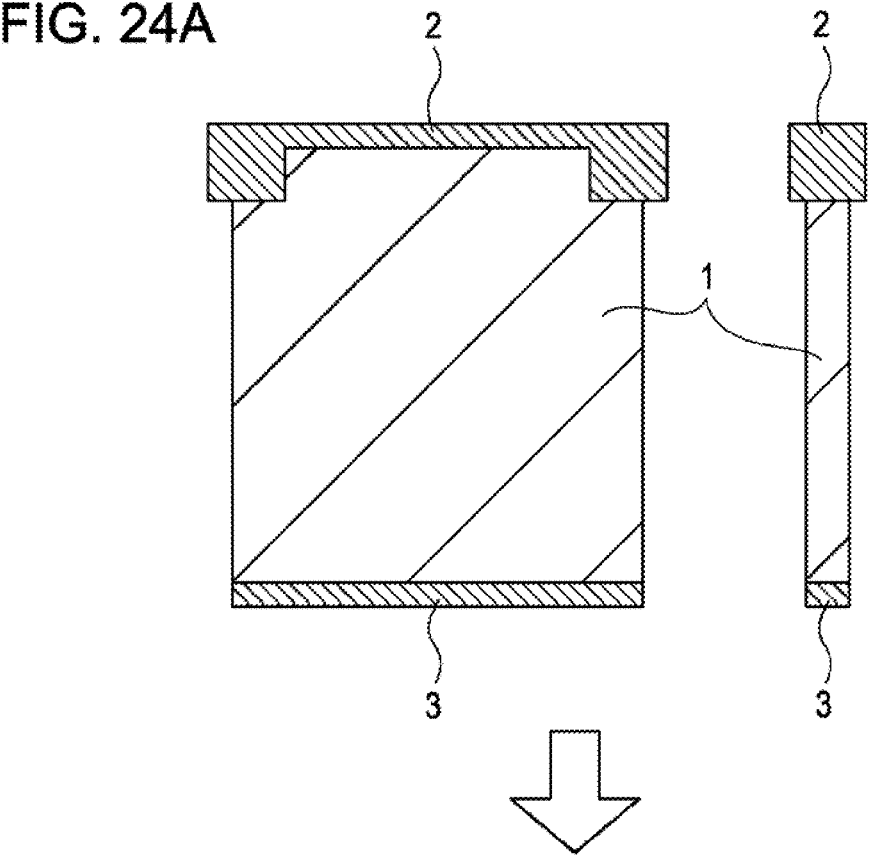
FIGS. 24A and 24B are schematic views used for describing a free fall drop test and a random free fall drop test for a battery pack in Example 12.
Figure 24B:
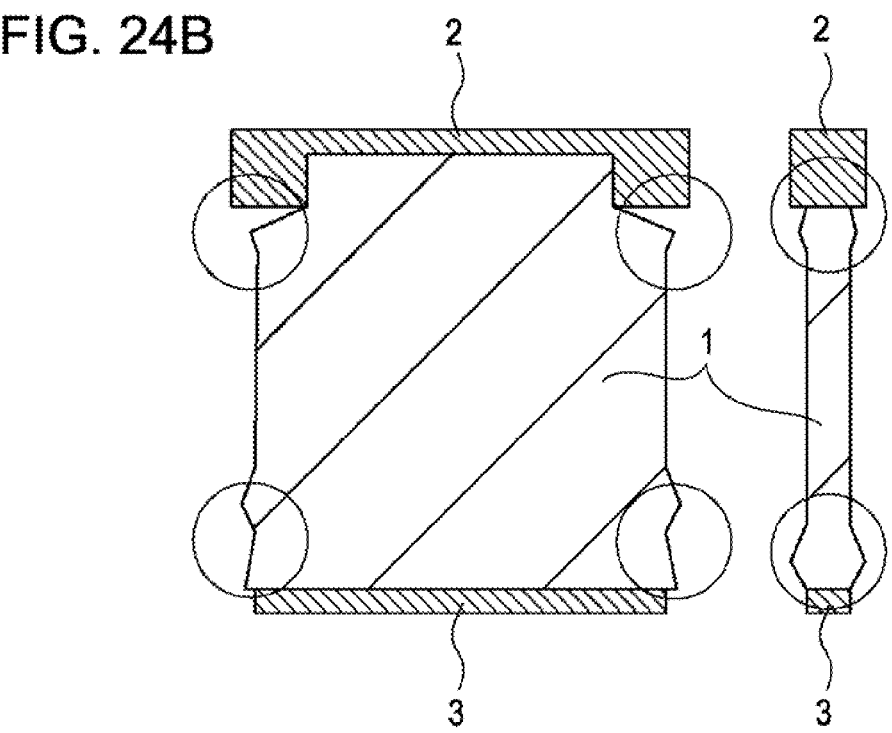
Figure 26A:
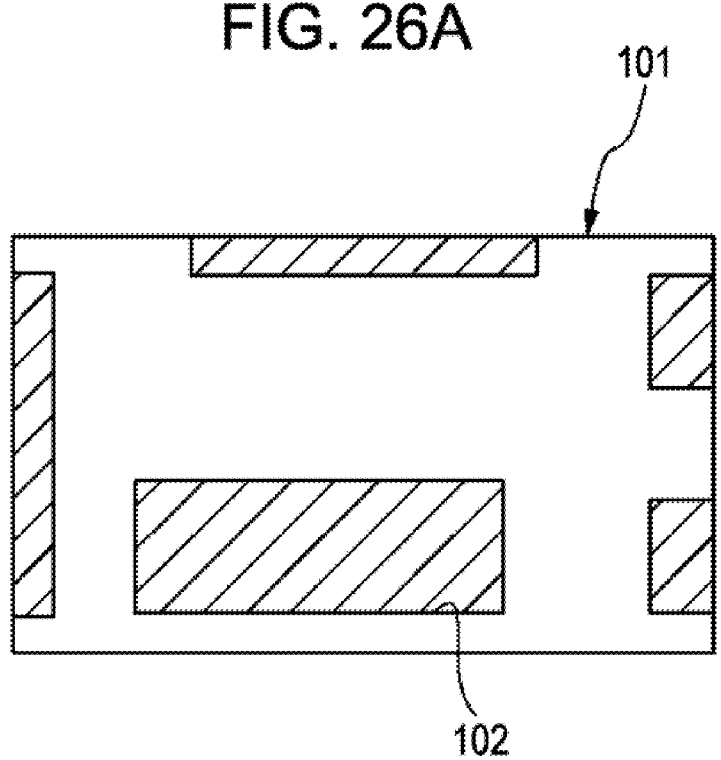
FIGS. 26A and 26B are schematic views each showing a battery pack housing part of an electronic device.
Figure 26B:
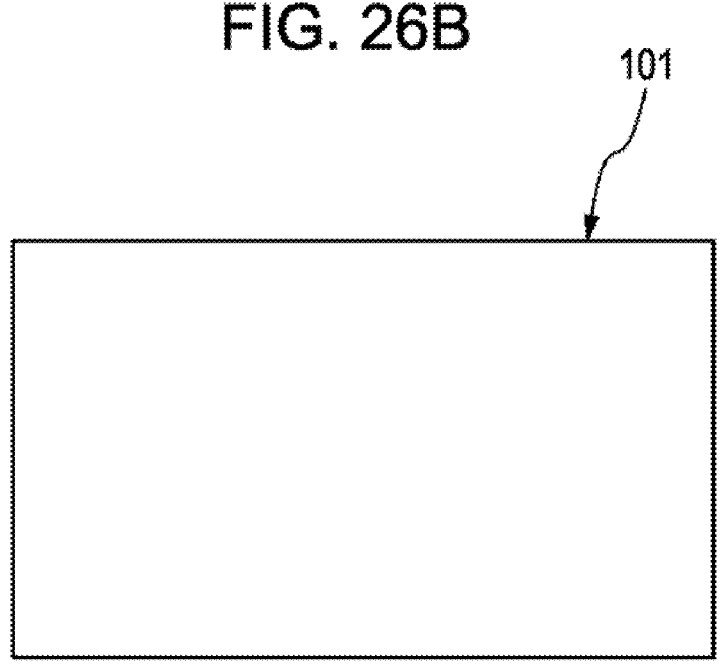
Figure 27A:
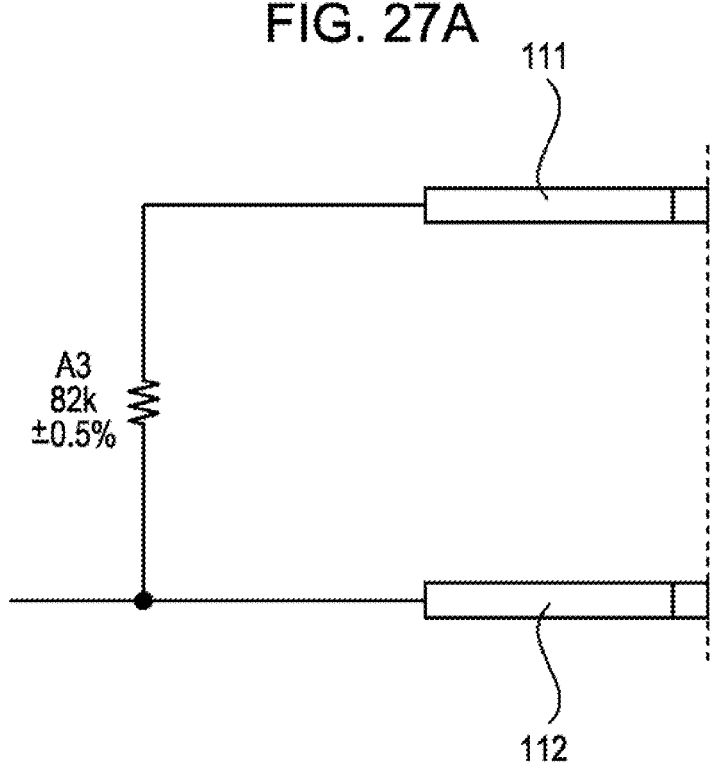
FIG. 27A is a circuit diagram showing a circuit before addition of a component for ESD protection.
Figure 27B:
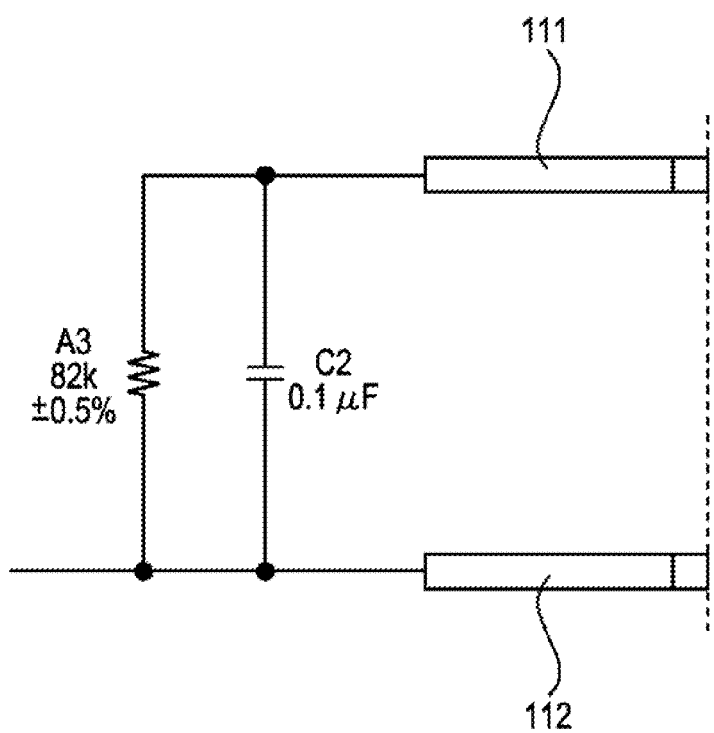
FIG. 27B is a circuit diagram showing a circuit after addition of a component for ESD protection.

The embodiments will be described in detail on the basis of examples. However, it is to be understood that they are not limited to the examples. FIG. 20 is an equivalent circuit diagram of a battery pack in each of Examples 1 to 5, and FIG. 21 is an equivalent circuit diagram of a battery pack in each of Examples 6 to 10.

Example 1

First, a battery element 4 shown in FIG. 3 was prepared. Next, after the battery element 4 was housed in an outer package 1, short sides of the outer package 1 were folded toward the outside of the bottom of the housing part 15 provided in the soft laminate 1a, and the short sides of the outer package 1 were heat-welded. The outer package 1 was also heat-welded to the bottom of the housing part 15 of the soft laminate 1a. Thereby, a top opening and a bottom opening were formed.

Next, the positive electrode lead 5a and the negative electrode lead 5b led from the battery element 4 are respectively electrically connected to the positive electrode terminal and the negative electrode terminal of the top cover 2. Next, as shown in FIG. 10A, one end of a conductive tape 30a was connected to the positive electrode lead 5a led from the battery element 4. Then, as shown in FIG. 10B, the other end of the conductive tape 30a was placed on the upper surface of the top cover 2. Next, as shown in FIG. 10C, while appropriately folding the positive electrode lead 5a and the negative electrode lead 5b, the top cover 2 was fitted into the top opening of the outer package 1. Next, the bottom cover 3 was fitted into the bottom opening of the outer package 1.

Next, heater blocks were pressed against the upper and lower sides of the vicinity of the top end of the outer package 1, and the periphery of the top cover 2 and the polypropylene layer inside the hard laminate 1b were heat-welded. Thereby, the polypropylene layer was melted and the other end of the conductive tape 30a held between the upper surface of the top cover 2 and the outer package 1 was electrically connected to the hard aluminum metal layer 17b. Next, a hot-melt resin was injected, through through-holes provided in the bottom cover 3, followed by solidification. Next, the resistance R between the positive electrode terminal 2a of the battery pack and the hard aluminum metal layer 17b of the outer package 1 was measured. The measured value was 100Ω.

Through the steps described above, the intended battery pack was obtained.

Example 2

A battery pack was obtained as in Example 1 except that the resistance R between the positive electrode terminal 2a of the battery pack and the hard aluminum metal layer 17b of the outer package 1 was set at 500Ω.

Example 3

A battery pack was obtained as in Example 1 except that the resistance R between the positive electrode terminal 2a of the battery pack and the hard aluminum metal layer 17b of the outer package 1 was set at 100 kΩ.

Example 4

A battery pack was obtained as in Example 1 except that the resistance R between the positive electrode terminal 2a of the battery pack and the hard aluminum metal layer 17b of the outer package 1 was set at 1 MΩ.

Example 5

A battery pack was obtained as in Example 1 except that the resistance R between the positive electrode terminal 2a of the battery pack and the hard aluminum metal layer 17b of the outer package 1 was set at 10 MΩ.

(ESD Tolerance Test)

Next, five battery packs were prepared for each of Examples 1 to 5. Each of the battery pack was contained in an electronic device, and an ESD tolerance test was carried out to determine whether or not a malfunction occurred in the electronic device. The tolerance test was carried out according to IEC61000-4-2. In the endurance test, ESD discharge was performed at varied test voltages of ±8 kV, ±15 kV, and ±25 kV. The results thereof are shown in Table 1 below.

TABLE 1

|  | Example 1 100 Ω | Example 2 500 Ω | Example 3 100 kΩ | Example 4 1 MΩ | Example 5 10 MΩ |
| --- | --- | --- | --- | --- | --- |
| ±8 kV | 5/5 | 5/5 | 5/5 | 5/5 | 5/5 |
| ±15 kV | 5/5 | 5/5 | 5/5 | 5/5 | 3/5 |
| ±25 kV | 5/5 | 5/5 | 5/5 | 5/5 | 4/5 |

Example 6

A battery pack was obtained as in Example 1 except that one end of a conductive tape 30a was connected to the negative electrode lead 5b led from the battery element 4 as shown in FIG. 13A, another end of the conductive tape 30a was electrically connected to the hard aluminum metal layer 17b, and the resistance R between the negative electrode terminal 2b of the battery pack and the hard aluminum metal layer 17b of the outer package 1 was set at 100Ω.

Example 7

A battery pack was obtained as in Example 6 except that the resistance R between the negative electrode terminal 2b of the battery pack and the hard aluminum metal layer 17b of the outer package 1 was set at 500Ω.

Example 8

A battery pack was obtained as in Example 6 except that the resistance R between the negative electrode terminal 2b of the battery pack and the hard aluminum metal layer 17b of the outer package 1 was set at 100 kΩ.

Example 9

A battery pack was obtained as in Example 6 except that the resistance R between the negative electrode terminal 2b of the battery pack and the hard aluminum metal layer 17b of the outer package 1 was set at 1 MΩ.

Example 10

A battery pack was obtained as in Example 6 except that the resistance R between the negative electrode terminal 2b of the battery pack and the hard aluminum metal layer 17b of the outer package 1 was set at 10 MΩ.

(ESD Tolerance Test)

Next, five battery packs were prepared for each of Examples 6 to 10. Each of the battery pack was contained in an electronic device, and an ESD tolerance test was carried out to determine whether or not a malfunction occurred in the electronic device. The tolerance test was carried out according to IEC61000-4-2. In the endurance test, ESD discharge was performed at varied test voltages of ±8 kV, ±15 kV, and ±25 kV. The results thereof are shown in Table 2 below.

TABLE 2

|  | Example 6 100 Ω | Example 7 500 Ω | Example 8 100 kΩ | Example 9 1 MΩ | Example 10 10 MΩ |
| --- | --- | --- | --- | --- | --- |
| ±8 kV | 5/5 | 5/5 | 5/5 | 5/5 | 5/5 |
| ±15 kV | 5/5 | 5/5 | 4/5 | 5/5 | 3/5 |
| ±25 kV | 5/5 | 5/5 | 4/5 | 3/5 | 2/5 |

The followings are evident from Tables 1 and 2.

The ESD tolerance can be improved by electrically connecting the positive electrode lead $5a$ or the negative electrode lead $5b$ of the battery element 4 to the conductive layer of the outer package 1 and by setting the conductive layer of the outer package 1 to have a positive or negative electric potential.

In the battery pack in which the positive electrode lead $5a$ of the battery element 4 and the conductive layer of the outer package 1 are electrically connected to each other, the ESD tolerance is excellent compared to the battery pack in which the negative electrode lead $5b$ of the battery element 4 and the conductive layer of the outer package 1 are electrically connected to each other. In particular, the difference becomes conspicuous in the range where the electric potential of the ESD discharge exceeds ±15 kV.

In the battery pack in which the positive electrode lead $5a$ of the battery element 4 and the conductive layer of the outer package 1 are electrically connected to each other, by setting the resistance R between the positive electrode terminal $2a$ of the battery pack and the metal layer of the outer package 1 at 1 MΩ or less, the ESD tolerance can be improved.

In the battery pack in which the negative electrode lead $5b$ of the battery element 4 and the conductive layer of the outer package 1 are electrically connected to each other, by setting the resistance R between the negative electrode terminal $2b$ of the battery pack and the metal layer of the outer package 1 at 500Ω or less, the ESD tolerance can be improved.

In general, an antistatic sheet used for ESD protection has a surface resistance of several megaohms (MΩ). It is common knowledge that such a high surface resistance has an effect of promoting static electricity diffusion.

Meanwhile, when the conductor resistance between the conductive layer of the outer package 1 and the electrode lead of the battery element 1 increases, a state equivalent to static electricity diffusion, not static electricity penetration, is produced. In particular, in the region where the resistance exceeds 15 kV, it can be estimated on the basis of the measurement results of the examples described above that, in the case where the conductive layer of the outer package 1 is connected to GND, complete static electricity penetration does not occur, static electricity diffusion partially starts, and as a result, electric current flows into the casing, resulting in ESD damage.

On the basis of the above findings, it is believed that, by limiting the connection resistance and quantitatively defining the effect of suppressing static electricity diffusion, the ESD tolerance can be improved regardless of the form of the casing.

Example 11

A battery pack was obtained as in Example 1 except that a PET label 41 was bonded to the outer package 1 so as to cover the entire surface of the outer package 1.

Example 12

A battery pack was obtained as in Example 1 except that an SUS label 61 was bonded to the outer package 1 so as to cover the entire surface of the outer package 1.

(Free Fall Drop Test)

A free fall drop test was carried out on each of the battery packs of Examples 11 and 12 as follows. From a height of 1.5 m, fall tests were carried out twelve times in total (6 surfaces of the battery pack×2 cycles), and it was checked whether cracks or detachment occurred in all the components constituting the battery pack (refer to FIGS. 22A, 22B, 24A, and 24B).

(Random Free Fall Drop Test)

A random free fall drop test was carried out on each of the battery packs of Examples 11 and 12 as follows. From a height of 1.0 m, each battery pack was dropped 200 times onto an iron sheet with a thickness of 3 mm, and it was checked whether cracks or detachment occurred in all the components constituting the battery pack (refer to FIGS. 22A, 22B, 24A, and 24B).

(Punching Durability Test)

A punching durability test was carried out on each of the battery packs of Examples 11 and 12 as follows. Using a punching jig (made of iron having a diameter of 8 mm; an end diameter of 3 mm; 45° cut) 92, each battery pack was subjected to the punching test at a load of 400 N and a speed of 1.5 mm/min. It was checked whether internal short-circuiting occurred in the battery pack (refer to FIGS. 23A, 23B, 25A, and 25B).

The followings are found from the test results.

In Example 11, since the PET label is soft, it is not possible to greatly improve the mechanical strength of the battery pack. In contrast, in Example 12, since the SUS label is harder than the PET label, it is possible to greatly improve the mechanical strength of the battery pack.

The numerical values, shapes, structures, etc. described in the embodiments and the examples are merely examples, and numerical values, shapes, structures, etc. different from those described above may be used as necessary.

Furthermore, the structures according to the first to fourth embodiments can be combined with each other.

Furthermore, in each of the first to fourth embodiments, an example is applied to a winding-type battery including a positive electrode and a negative electrode being wound with an electrolyte layer being interposed therebetween has been described. However, the embodiments are also applicable to a laminate-type (stack-type) battery in which a positive electrode, an electrolyte layer, and a negative electrode are laminated in that order.

Furthermore, in each of the first to fourth embodiments, an example applied to a battery pack for a secondary battery has been described. However, the embodiments are also applicable to a battery pack for a primary battery.

Furthermore, in each of the first to fourth embodiments, an example is applied to a battery having a gel electrolyte as an electrolyte has been described. However, the embodiments are also applicable to a battery having a solid electrolyte containing an electrolyte salt as an electrolyte. The embodiments are also applicable to a battery having an electrolyte solution, such as a nonaqueous electrolyte solution, as an electrolyte.

Furthermore, in each of the first and second embodiments, an example in which a positive electrode lead $5a$ or a negative electrode lead $5b$ of a battery element 4 is electrically connected to a conductive layer of an outer package 1 has been described. As long as the conductive layer of the outer package 1 and the positive electrode or the negative electrode of the battery element 4 are electrically connected to each other, the portion to be electrically connected to the conductive layer of the outer package 1 is not particularly limited to the example. For example, a positive electrode terminal $2a$ or a negative electrode terminal 2b of the battery pack, or a positive electrode terminal or a negative electrode terminal of a circuit board 22 may be electrically connected to the conductive layer of the outer package 1.

Furthermore, in the fourth embodiment, an example in which a positive electrode terminal of the circuit board 22 and a metal substrate of the metal label 61 are electrically connected to each other has been described. However, a negative electrode terminal of the circuit board 22 and the metal substrate of the metal label 61 may be electrically connected to each other.

Furthermore, in the fourth embodiment, an example in which an electrode terminal of the circuit board 22 and a metal substrate of the metal label 61 are electrically connected to each other has been described. As long as the metal substrate of the metal label 61 and the electrode of the battery element 4 can be electrically connected to each other, the portion to be electrically connected to the metal substrate of the metal label 61 is not particularly limited to the example. For example, the electrode terminal of the battery pack or the electrode lead of the battery element 4 may be electrically connected to the metal substrate of the metal label 61.

Furthermore, in each of the third and fourth embodiments, preferably, both the metal substrate of the metal label 61 and the conductive layer of the outer package 1 are electrically connected to the positive electrode or the negative electrode of the battery element 4. Examples of the contact method include a method in which one or a plurality of protrusions are provided on a principal surface of the metal substrate of the metal label 61 facing the outer package 1, out of both principal surfaces of the metal substrate, and the protrusions are electrically brought into contact with the conductive layer of the outer package 1, and a method in which one or a plurality of protrusions are provided on a principal surface of the metal layer of the outer package facing the metal label 61, out of both principal surfaces of the metal layer, and the protrusions are electrically brought into contact with the metal substrate of the metal label 61.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
an outer package including:
(i) a first laminate including a housing part,
(ii) a second laminate overlaid on the first laminate covering an open surface of the housing part, wherein the first laminate and the second laminate are shifted from each other, and
(iii) a heat-weld sheet disposed on an outer bottom surface of the housing part,
wherein at least one of the first laminate or the second laminate includes a conductive layer;
a battery element housed in the outer package;
a top cover; and
a positive electrode lead of the battery element is electrically connected to the conductive layer of the outer package with a first end of a conductive tape, wherein a second end of the conductive tape connects to an upper surface of the top cover, said top cover fitted onto a top opening of the outer package when the positive electrode lead and a negative electrode lead are folded.

2. The battery pack according to claim 1, wherein the resistance between the positive electrode terminal and the conductive layer of the outer package is 1 MΩ or less.

3. The battery pack according to claim 1, wherein the first laminate and the second laminate are substantially a same size; and
each of the first laminate and the second laminate has a conductive layer.

4. The battery pack according to claim 1, wherein the conductive layer of the first laminate is a soft aluminum metal layer; and
the conductive layer of the second laminate is a hard aluminum metal layer.

5. The battery pack according to claim 1, wherein the first laminate includes an adhesion layer, a soft aluminum metal layer, and a surface protection layer laminated in that order;
the second laminate includes an adhesion layer, a hard aluminum metal layer, and a surface protection layer laminated in that order; and
the adhesion layer of the first laminate and the adhesion layer of the second laminate face each other.

6. The battery pack according to claim 1, which includes insulating tapes disposed between the top cover and the outer package.

* * * * *